US 9,319,446 B2

(12) United States Patent
Panje et al.

(10) Patent No.: US 9,319,446 B2
(45) Date of Patent: *Apr. 19, 2016

(54) SYSTEM AND METHOD FOR TRANSPORT STREAM SYNC BYTE DETECTION WITH TRANSPORT STREAM HAVING MULTIPLE EMULATED SYNC BYTES

(71) Applicant: Google Technology Holdings LLC, Mountain View, CA (US)

(72) Inventors: Krishna Prasad Panje, Bangalore (IN); Virendra Singh, Bangalore (IN); Sundar Murthy Tumuluru, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/486,688

(22) Filed: Sep. 15, 2014

(65) Prior Publication Data

US 2015/0006683 A1    Jan. 1, 2015

Related U.S. Application Data

(63) Continuation of application No. 13/285,271, filed on Oct. 31, 2011, now Pat. No. 8,872,970.

(51) Int. Cl.
*H04N 5/08* (2006.01)
*H04J 3/16* (2006.01)
(Continued)

(52) U.S. Cl.
CPC ............ *H04L 65/60* (2013.01); *H04L 7/042* (2013.01); *H04N 21/4305* (2013.01); *H04L 7/10* (2013.01)

(58) Field of Classification Search
CPC .... H04N 21/4305; H04L 65/60; H04L 7/042; H04L 7/10
See application file for complete search history.

(56) References Cited

U.S. PATENT DOCUMENTS 5,708,689 A    1/1998 Shin
5,920,572 A *  7/1999 Washington ....... H04N 21/4181
                                                348/476

(Continued)

FOREIGN PATENT DOCUMENTS

EP    0735709    3/2004

OTHER PUBLICATIONS

Office Action for U.S. Appl. No. 13/285,271, dated Mar. 26, 2013, 26 pages.
(Continued)

*Primary Examiner* — Jefferey Harold
*Assistant Examiner* — Sean Haiem
(74) *Attorney, Agent, or Firm* — Fenwick & West LLP

(57) ABSTRACT

A method and receiving device are provided that determine a synchronization byte in a plurality of transport stream packets, wherein the synchronization byte has a predetermined synchronization value. The method/receiving device receives, via a receiver, a portion of a first transport stream packet of the plurality of transport stream packets; detects, starting from the beginning of the portion of a first transport stream packet, a continuous four byte pattern that does not include the predetermined synchronization value; detects a first occurrence of a byte having the predetermined synchronization value; detects a subsequent byte separated from the first occurrence by a predetermined byte length; determines a byte value of the subsequent byte; and validates that the first occurrence is the synchronization byte based on a comparison of the byte value and the predetermined synchronization value.

20 Claims, 20 Drawing Sheets

(51) Int. Cl.
- *H04J 3/22* (2006.01)
- *H04J 3/06* (2006.01)
- *H04L 9/00* (2006.01)
- *H04L 7/04* (2006.01)
- *H04L 7/10* (2006.01)
- *H04N 21/43* (2011.01)
- *H04L 29/06* (2006.01)

(56) References Cited

U.S. PATENT DOCUMENTS

| | | | |
|---|---|---|---|
| 6,154,468 A | 11/2000 | Lin et al. | |
| 6,298,387 B1 * | 10/2001 | Prasad | H04L 7/042 370/509 |
| 6,625,240 B1 | 9/2003 | Miyahara | |
| 6,804,266 B1 * | 10/2004 | Kovacevic | H04J 3/07 348/E5.005 |
| 6,816,560 B1 | 11/2004 | Spalink | |
| 7,139,289 B2 | 11/2006 | Fukuoka et al. | |
| 7,539,258 B2 | 5/2009 | Nakajima | |
| 2005/0207446 A1 | 9/2005 | Hadad | |
| 2009/0168867 A1 | 7/2009 | Verbrugge et al. | |
| 2009/0257584 A1 * | 10/2009 | Yanamoto | H04L 9/065 380/42 |
| 2011/0022399 A1 | 1/2011 | Lien | |
| 2011/0221961 A1 * | 9/2011 | Kurihara | H04N 21/4302 348/525 |
| 2012/0120969 A1 * | 5/2012 | Lee | H04N 21/434 370/471 |

OTHER PUBLICATIONS

Office Action for U.S. Appl. No. 13/285,271, dated Aug. 2, 2013, 16 pages.
Notice of Allowance for U.S. Appl. No. 13/285,271, dated Feb. 19, 2014, 12 pages.
Notice of Allowance for U.S. Appl. No. 13/285,271, dated Jun. 13, 2014, 18 pages.
Patent Cooperation Treaty, "PCT Search Report and Written Opinion of the International Searching Authority" for International Application No. PCT/US2012/057464 dated Feb. 5, 2013, 12 pages.

* cited by examiner

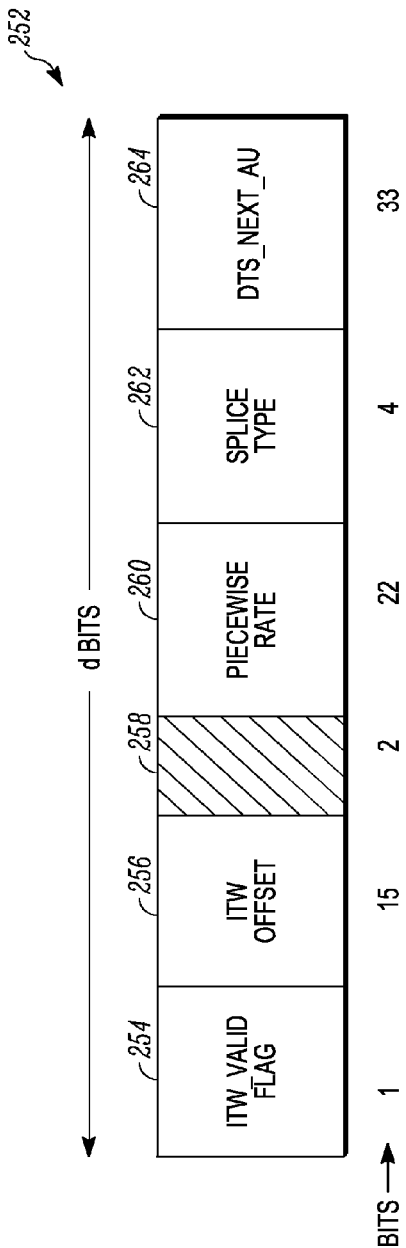
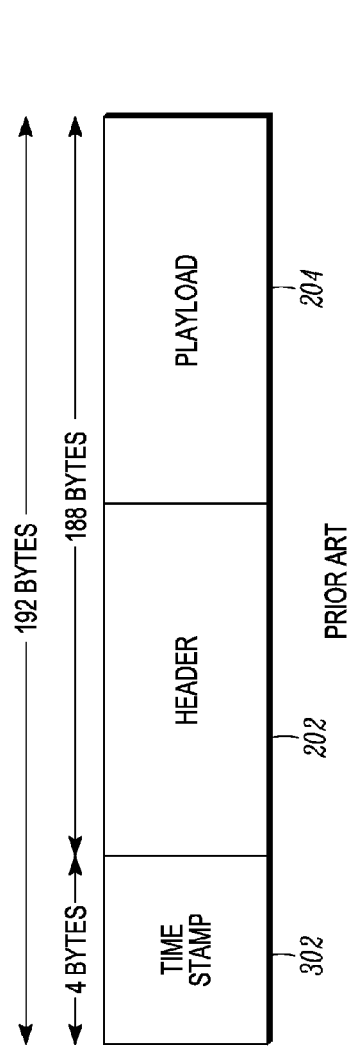
FIG. 2E PRIOR ART
FIG. 3 PRIOR ART

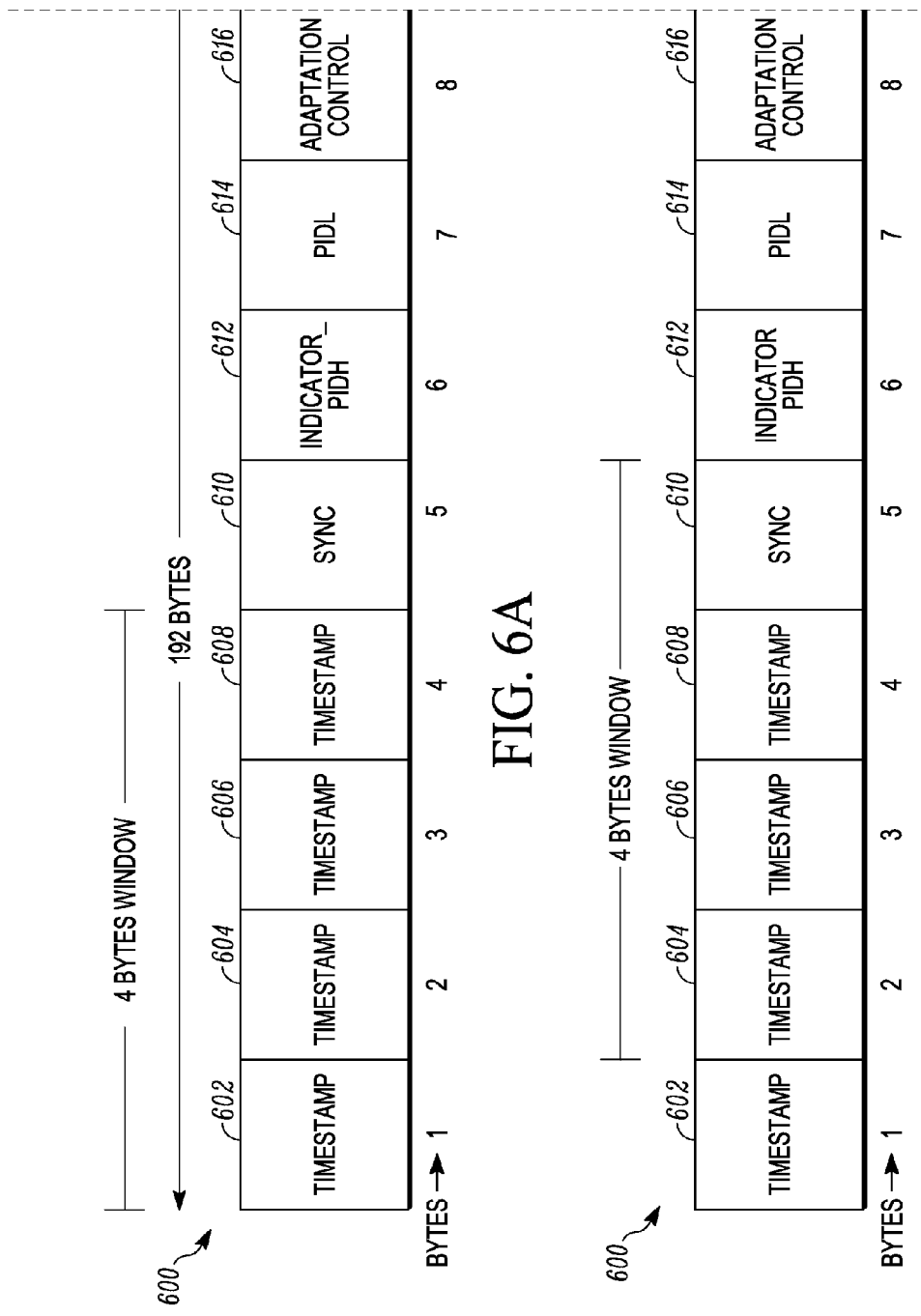

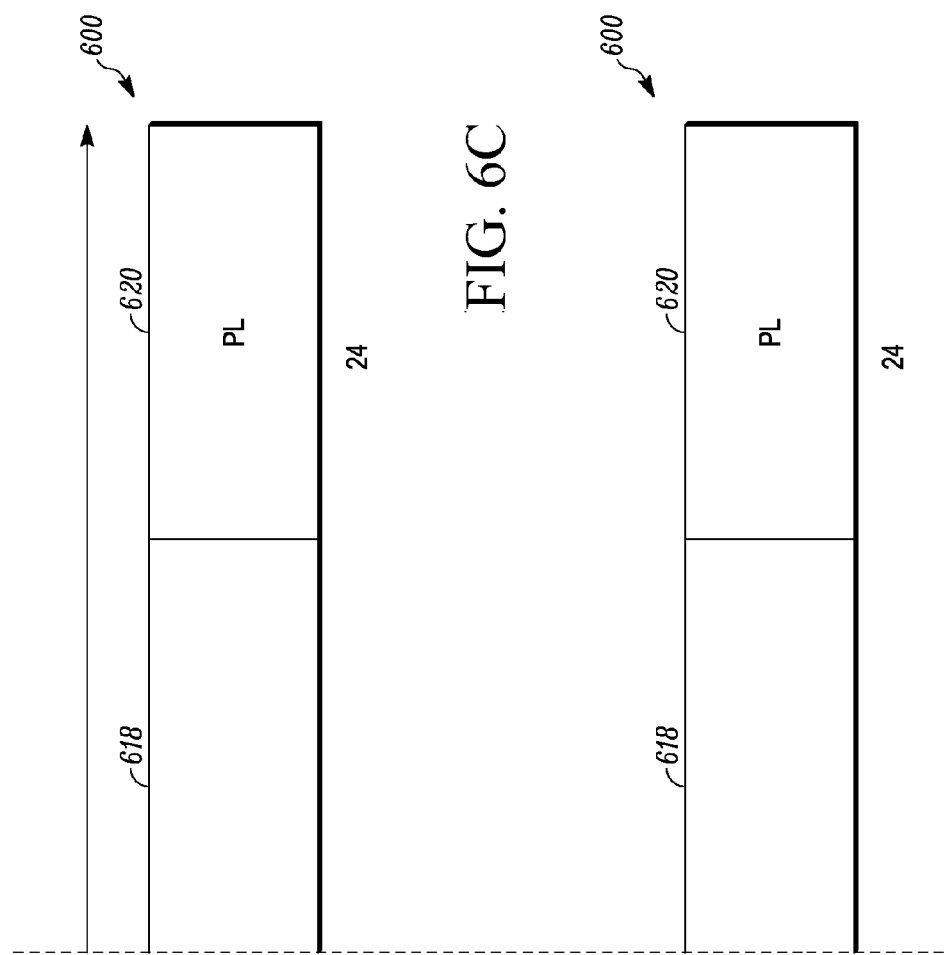

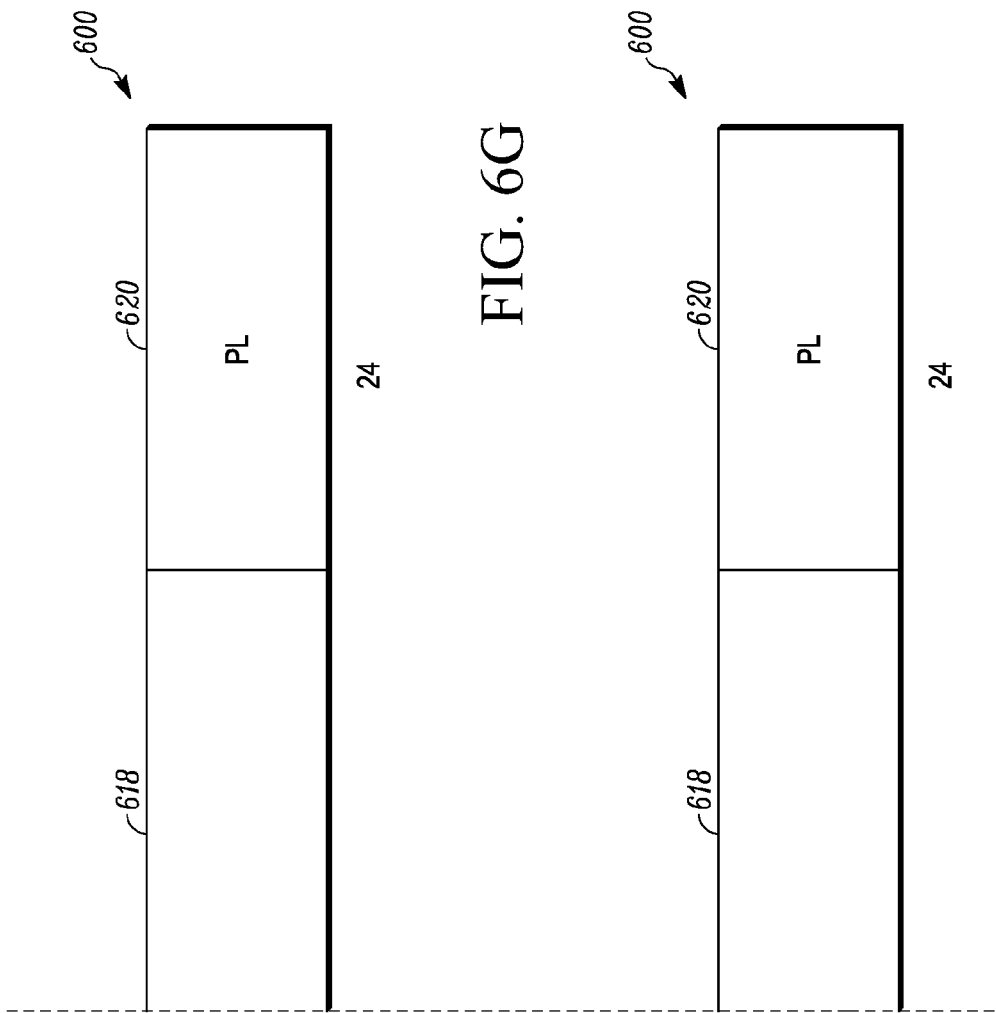

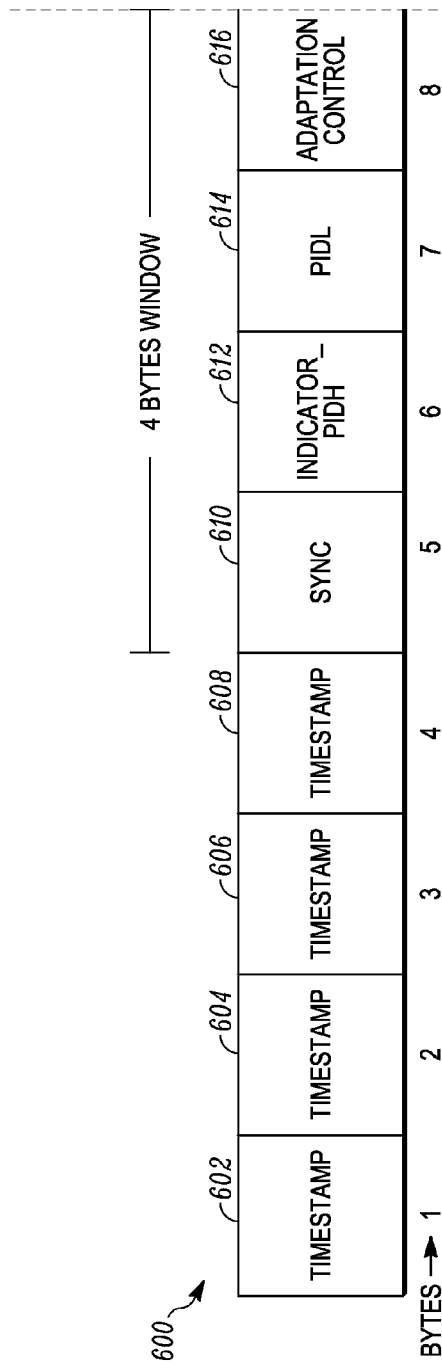
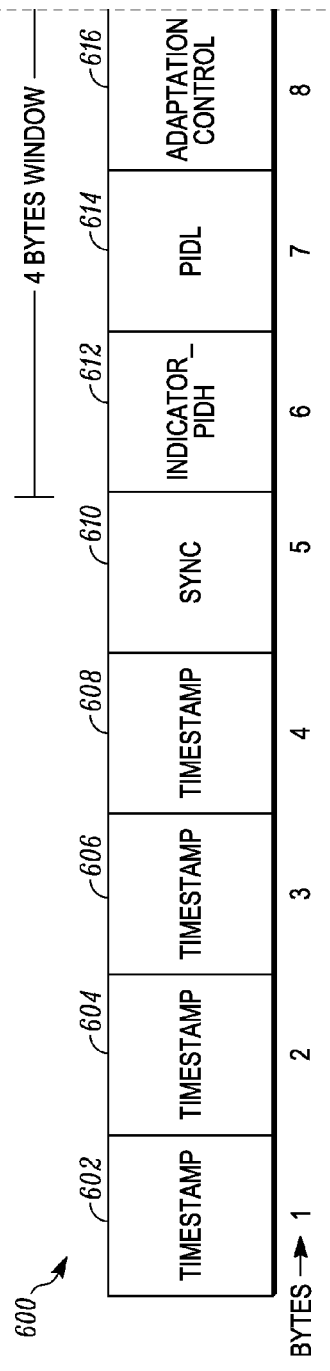

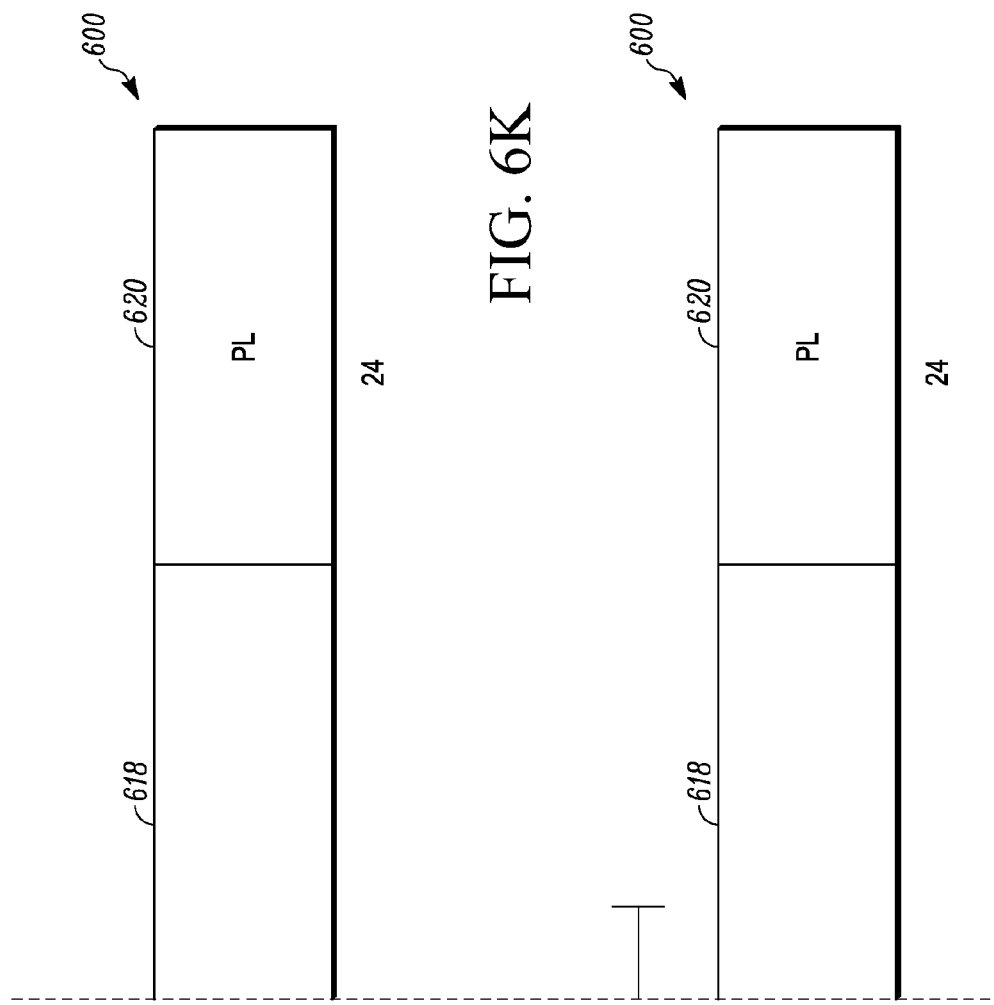

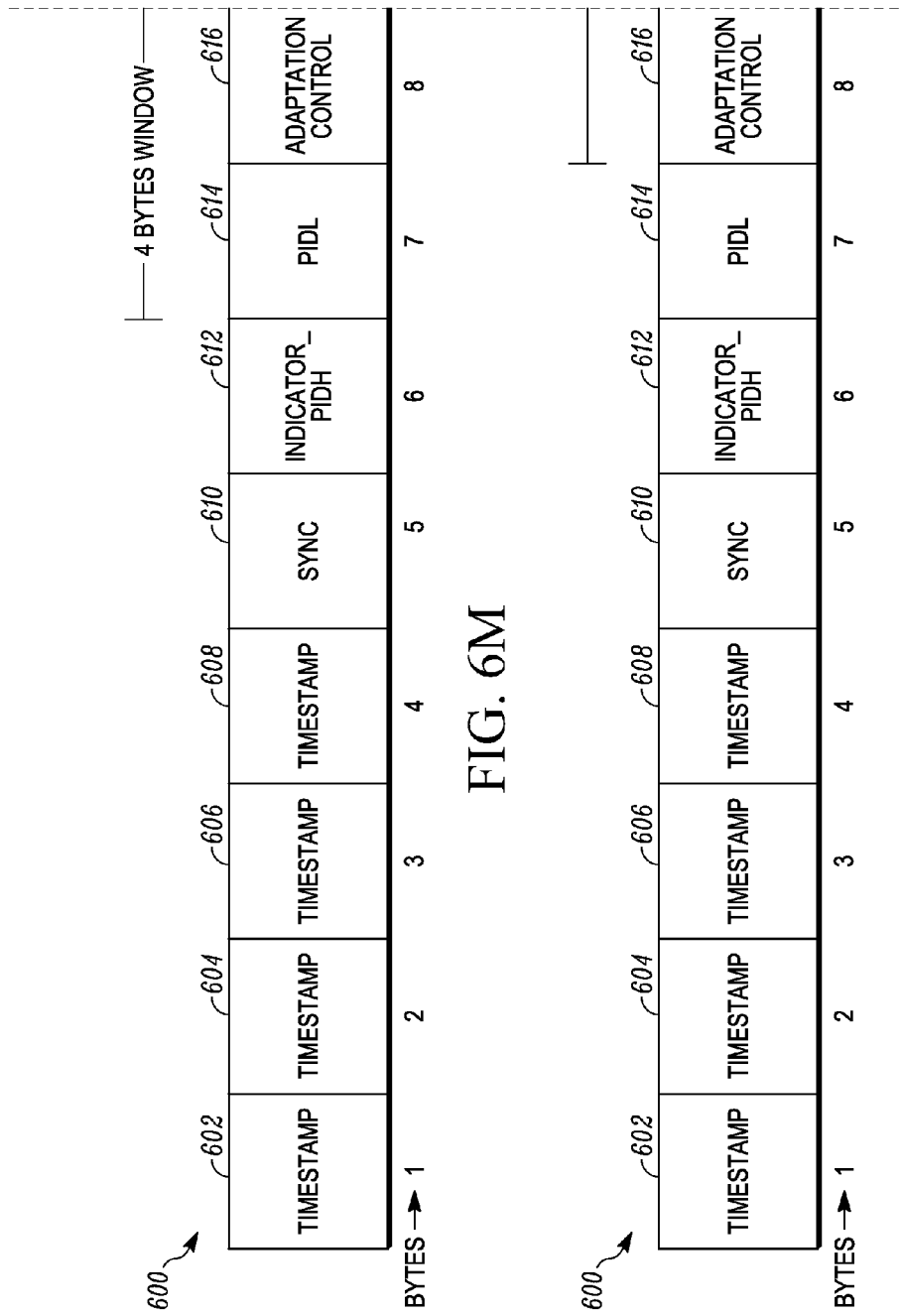

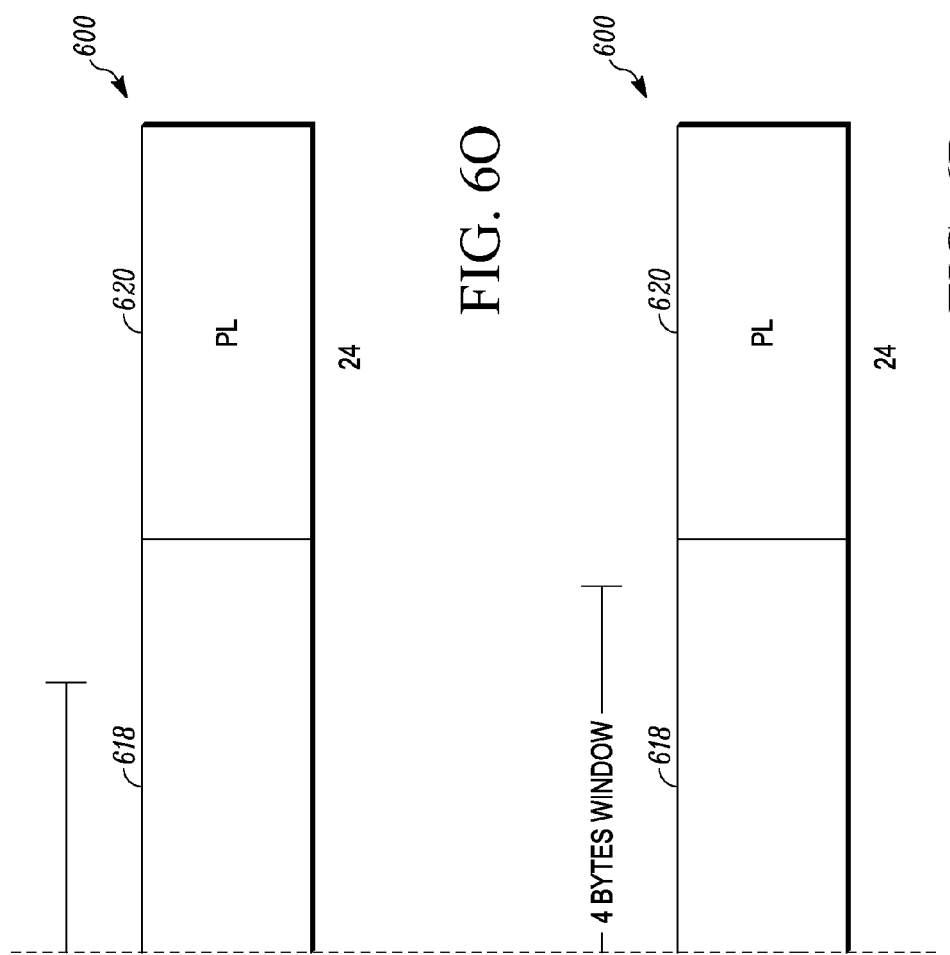

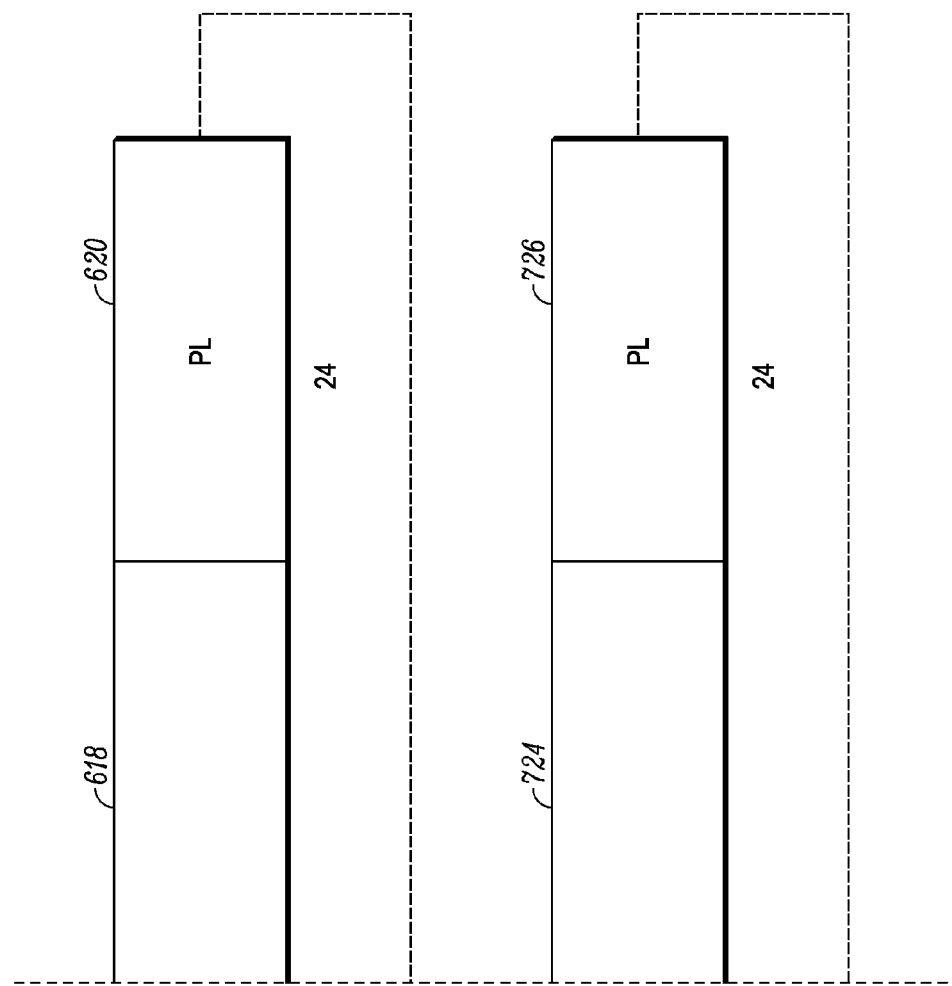

SYSTEM AND METHOD FOR TRANSPORT STREAM SYNC BYTE DETECTION WITH TRANSPORT STREAM HAVING MULTIPLE EMULATED SYNC BYTES

CROSS-REFERENCE TO RELATED APPLICATIONS

This application is a continuation of U.S. patent application Ser. No. 13/285,271, filed Oct. 31, 2011, and entitled, "SYSTEM AND METHOD FOR TRANSPORT STREAM SYNC BYTE DETECTION WITH TRANSPORT STREAM HAVING MULTIPLE EMULATED SYNC BYTES," the entirety of which is incorporated herein by reference.

BACKGROUND

The present invention relates to the field of digital broadcasting, and in particular to broadcasting with an MPEG2 Transport Stream (TS) used for transmitting digital audio and video over lossy networks.

MPEG2 is widely used as the format of digital television signals that are broadcast by terrestrial (over-the-air), cable, internet, Over The Top (OTT) or direct broadcast satellite TV systems. The MPEG2 TS is a standard format for transmission and storage of audio, video, and Program and System Information Protocol (PSIP) data, and is used in broadcast systems, such as DVB (Digital Video Broadcasting) and ATSC (Advanced Television Systems Committee).

The TS is specified in MPEG-2 Part 1, Systems. A TS specifies a container format encapsulating Packetized Elementary Streams (PES), with error correction and stream synchronization features for maintaining transmission integrity when the signal is degraded. Multiple MPEG programs are combined in a transmitting stream packet and then sent to a transmitting antenna. On a receiving side, a transmitting stream packet is received, decoded and displayed on a display device. This will now be explained with reference to FIG. 1.

FIG. 1 illustrates a conventional communication system 100. As illustrated in the figure, conventional communication system 100 includes a transmitter 102 transmitting a transport stream 122 over a network 106, which is received by a receiver 104. Conventional communication system 100 may include a plurality of receivers; however, for illustration purposes only one receiver is shown.

Receiver 104 includes a tuner 108, a TS buffer 110, a decoder 112, a processor 114, a memory 116, a hard disk drive (HDD) 118 and a display interface unit 120. In this example, tuner 108, TS buffer 110, decoder 112, processor 114, memory 116, HDD 118 and display interface unit 120 are distinct elements. However, in some embodiments, at least two of tuner 108, TS buffer 110, decoder 112, processor 114, memory 116, HDD 118 and display interface unit 120 may be combined as a unitary element. Further, in some embodiments, at least one of tuner 108, TS buffer 110, decoder 112, processor 114, memory 116, HDD 118 and display interface unit 120 may be implemented as a tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a tangible computer-readable medium. Thus, any such connection is properly termed a tangible computer-readable medium. Combinations of the above should also be included within the scope of tangible computer-readable media.

Tuner 108 is arranged to receive a data signal 124 and to output a signal 126 to TS buffer 110. Decoder 112 is arranged to receive a signal 128 from TS buffer 110. Processor 114 is arranged to bi-directionally communicate with tuner 108 via a signal 130; bi-directionally communicate with TS buffer 110 via a signal 132; bi-directionally communicate with decoder 112 via a signal 134; bi-directionally communicate with memory 116 via a signal 136; bi-directionally communicate with HDD 118 via a signal 138; and communicate with display interface unit 120 via a signal 140. Display interface unit 120 is arranged to output an output signal 142.

A TS packet is the basic unit of data in a transport stream. Tuner 108 is always receiving TS packets via data signal 124. Ideally, receiver 104 can be tuned to a channel at any moment of time. Once tuner 108 detects a TS packet, it forwards it to TS buffer 110 via a signal 126. TS packets are fed in to decoder 112 via a signal 128 for decoding the multimedia data. In case, when the multimedia data was compressed and modulated before transmitting it over network 106, tuner 108 may include a de-compressor/demodulator to recover the data before feeding it to TS buffer 110.

Processor 114 provides all the controls on receiver 104. Processor 114 may include a digital signal processor (DSP) and/or a multimedia processor.

Decoder 112 may include an audio/video (AV) decoder. HDD 118 stores multimedia data. Memory 116 may include a program memory as well. Display 120 provides output signal 142 to display multimedia data on a display device, for example, a TV screen, a monitor, a game console or a mobile device.

In one example, transmitter 102 is a cable TV headend, which is transmitting multimedia data over cable network 106, and receiver 104 is a set top box (STB). In one example, STB is a Digital Video Recorder (DVR) that decodes, records and plays audio/video data received via a satellite dish or digital cable.

Transport stream 120 carries a plurality of TS packets over network 106. TS packets are normally 188 bytes in length, however, in some cases the length of the TS packets is modified. A standard format for a 188 byte TS packet will now be described with reference to FIGS. 2A-2E.

Referring now to FIGS. 2A-2E, a conventional TS packet 200 is illustrated. As depicted in FIG. 2A, TS packet 200 includes a header 202 and a payload 204, which together make up the 188 bytes. TS packet 200 is formed at a headend for transmitting multimedia data to a plurality of receivers. For example, TS packet 200 may be transmitted by transmitter 102. Header 202 includes the information about the data, whereas, payload 204 carries the actual data.

Header 202 is further described with the help of FIG. 2B. FIG. 2B illustrates an expanded form of header 202. Header 202 includes a synchronization byte 206, a transport error indicator 208 (one bit), a payload unit start indicator 210 (one bit), a transport priority 212 (one bit), a packet identifier (PID) 214, a transport scrambling control 216 (two bits), an adaptation field control 218 (two bits), a continuity counter 220 (4 bits) and an adaptation field 222.

Header 202 starts with synchronization byte (sync byte) 206, wherein a predetermined synchronization value is reserved for synchronization byte, which is hexadecimal forty seven (0x47 or 0100 0111). The one bit for transport error indicator 208 indicates that the TS packet has an uncorrectable error. The one bit for payload unit start indicator 210 indicates start of payload data. The one bit for transport priority 212 indicates higher priority than other packets with the same PID. PID 214 is assigned by the headend to uniquely identify the transport stream the packet belongs. PID 214 allows receiver 204 to differentiate the stream to which each received packet belongs.

The two bits for transport scrambling control 216 identifies whether even or odd scrambling was used. With the two bits for adaptation field control 218: a value of '01' indicates no adaptation fields, but only payload exists; a value of '10' indicates only adaptation field exists; and a value of '11' indicates that both adaptation fields and payload exist.

The four bits for continuity counter 220 are incremented for every TS packet belonging to the same stream only when a payload is present.

If adaptation field control 218 is '10' or '11' then an adaptation field 222 is appended to header 202. If adaptation field control 218 is '01', then only payload 204 follows header 202. Adaptation field 222 is illustrated to be 'a' bits in length, where 'a' is a variable.

FIG. 2C illustrates an expanded form of adaptation field 222. As illustrated in the figure, adaptation field 222 includes 8 bit adaptation field length 224, one bit discontinuity indicator 226, one bit random access indicator 228, one bit elementary stream priority indicator 230, five bit flags 232, 'b' bits optional fields 234 and 'c' bits stuffing bytes 236, where 'b' and 'c' are variables.

FIG. 2D illustrates an expanded form of optional fields 234. As illustrated in the figure, optional fields 234 include a forty two bits Program Clock Reference (PCR) 238, a forty two bits Original Program Clock Reference (OPCR) 240, eight bits splice countdown 242, eight bits transport private data length 244, transport private data 246, eight bits adaptation field extension length 248, three bit flags 250, and 'd' bits optional fields 252, where 'd' is a variable.

FIG. 2E illustrates an expanded form of optional fields 252. As illustrated in the figure, optional fields 252 include one bit ltw_valid flag 254, fifteen bit ltw offset 256, two reserved bits 258, twenty two bits piecewise rate field 260, four bit splice type 262, thirty three bits DTS_next_au field 264.

In most cases, multimedia data that is transported over a lossy network is packed in to the 188 bytes of a TS packet. However, for some applications, a four byte timestamp is prefixed to each 188 byte TS packet while recording, thus resulting in a 192 byte TS packet. This is shown below with the help of FIG. 3.

FIG. 3 illustrates a conventional 192 byte TS packet. As illustrated in the figure, TS packet 300 includes a 4 bytes time stamp 302, in addition to header 202 and payload 204, thus making TS packet 300 to be 192 bytes long. Time stamp 302 is known as "pacing time" and is used for keeping track of the real time the data was recorded, in order to play back the recorded data at the same rate it was received.

For the purposes of discussion, the term TS packet will be used hereon in this specification for TS packet 200 or TS packet 300 accordingly.

The beginning of each TS packet received by receiver 104 is identified by sync byte 206, which is assigned a fixed unique number. Tuner 108 is always receiving TS packets. Once tuner 108 identifies sync byte 206 in a TS packet, the tuner locks on to the sync byte and forwards the TS packet to TS buffer 110. Decoder 112 decodes the TS packets stored in TS buffer 110 to separate out the header and the multimedia data. Every subsequent 188 byte or 192 byte (depending on the format) should exactly match with sync byte 206.

Ideally, receiver 104 can be tuned to a channel at any moment of time. Depending on the real time when tuner 108 starts to look for sync byte 206, in some cases, the tuner may receive only a portion of a TS packet for the first TS packet, i.e., real sync byte 206 may have already passed and the tuner detects the TS packet starting from the PID or the payload. In case of a 192 byte TS packet, the TS packet detected by the tuner may start from the middle of the timestamp.

In some cases, the value of sync byte 206 may be emulated somewhere else in the TS packet. In other words, a fake sync byte may be present in addition to the real sync byte. Since the tuner 108 is looking for a unique value for the sync byte in the TS packet to detect the beginning of the TS packet, if another continuous combination of the bits in the TS packet is the same as that unique number (on a byte boundary), tuner 108 may misinterpret that other continuous combination of bits as a sync byte. For example, when the unique number is expected to be 0x47, any byte in the TS packet that contains 0x47 may be interpreted as a sync byte, in case the real sync byte was missed.

Emulation of sync byte 206 in the TS packet may be present under certain conditions, which are discussed below.

In one scenario, PID 214 assigned by the headend may contain the unique number reserved for sync byte 206. PID 214 is part of each TS packet received by receiver 104, therefore, the emulation continues throughout the transport stream.

In another scenario, 4 bytes of timestamp 302 for TS packet 300 can also emulate sync byte 206 if it carries the unique number reserved for sync byte 206. For 188 bytes TS packets, this scenario does not exist.

In another scenario, any byte of payload 204 can match with the unique number reserved for sync byte 206, therefore, resulting in an emulated sync byte. Furthermore, payload 204 can also have emulated sync byte repeated in two consecutive TS packets, which may be duplicate packets due to accidental duplication or corruption.

In one scenario, second byte of header 202 can also emulate sync byte 206. For very low bit rate audio coding, wherein each audio frame is put in to one PES packet and each audio PES packet is fit in to one TS packet, for each TS packet, payload unit start indicator 210 is set to one, transport priority 212 is zero and 13 bit PID 214 is 0x7xx, thus resulting in 0x47 as the second byte of header 202. If PID 214 is 0x747 instead of 0x7xx then the TS packet will have three successive sync bytes at the start of header 202.

Even if second byte of header 202 is not one, there is still possibility of PID 214 along with time stamp 302 and payload 204 being 0x47, therefore, resulting in three emulated sync bytes in one TS packet.

As discussed above, different scenarios can cause receiver 104 to detect an emulated (fake) sync byte instead of the real sync byte 206. Once tuner 108 locks on to an emulated sync byte, it forwards the TS packet to decoder 112 for further decoding. Decoder 112 strips off the multimedia data out of the TS packet based on the emulated sync byte, which may be located either before or after the real sync byte. Wrong interpretation of the data causes the system to get unstable, thereby, resulting in poor end user experience.

In one example, different scenarios discussed above also have an impact on DVR trick play (pause and play) sessions.

Once a session is paused and played back, during the playback of the recorded content, the TS packet data is retrieved from HDD 118 and routed to decoder 112 for further decoding. If the sync byte detection fails to detect the correct sync byte in the TS packet then the wrong payload data is routed to AV decoders. AV decoders decode the wrong AV data throughout the session resulting in the DVR failure.

What is needed is a system and method for detecting TS sync bytes in the TS packets with multiple emulated sync bytes.

BRIEF SUMMARY

The present invention provides a system and method for detecting TS sync bytes in the TS packets with multiple emulated sync bytes.

In accordance with an embodiment of the present invention, a method is provided for determining a synchronization byte in a plurality of transport stream packets, wherein the synchronization byte has a predetermined synchronization value. The method includes: receiving, via a receiver, a portion of a first transport stream packet of the plurality of transport stream packets; detecting, via a synchronization byte detecting portion and starting from the beginning of the portion of a first transport stream packet, a continuous four byte pattern that does not include the predetermined synchronization value; detecting, via the synchronization byte detecting portion, a first occurrence of a byte having the predetermined synchronization value; detecting, via the synchronization byte detecting portion, a subsequent byte separated from the first occurrence by a predetermined byte length; determining, via the synchronization byte detecting portion, a byte value of the subsequent byte; and validating, via a synchronization byte validation portion, that the first occurrence is the synchronization byte based on a comparison of the byte value and the predetermined synchronization value.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIG. 2E illustrates an expanded form of optional fields of the optional fields of FIG. 2D;

FIG. 3 illustrates a conventional 192 bytes TS packet;

FIGS. 7A-7C illustrate four consecutive TS packets in accordance with an embodiment of the invention.

DETAILED DESCRIPTION

In various embodiments of the invention, a method and an apparatus are provided that detect probable candidate synchronization bytes (sync bytes) in ideal conditions in a TS packet and that minimize a likelihood of an emulated, or fake, candidate sync byte being mistaken for a real sync byte. As discussed above, a predetermined synchronization value is reserved for the sync byte, for example, a hexadecimal forty seven (that is, 0x47, which corresponds to a bit pattern '0100 0111'). Since both a transmitter and a receiver are aware of this predetermined synchronization value, this value may be used to synchronize the transmitter and the receiver, and in particular to allow the receiver to detect the starting point of a transmitted TS packet. However, due to packet corruption, an emulation of the sync byte can occur in a PID, a timestamp or a payload portion of the TS packet. In some cases, there could be multiple emulated sync bytes in the same TS packet. The methods and apparatus described herein minimize the likelihood that such emulated sync bytes are mistaken by the receiver for a real sync byte.

In accordance with an embodiment of the invention, a first step is to make sure that the search for the sync byte is started from payload 204 and not from PID 214. This is to avoid the possibility of searching for the start of the packet in emulated bytes. In order to avoid detecting a PID emulated sync byte first, embodiments of the invention provide an algorithm to search for a sync byte every four consecutive bytes starting from the beginning of the TS buffer, where the TS packets are stored, until no sync byte is found in four consecutive bytes. This optimizes the probability that the detected sync byte is not a PID emulated sync byte.

Once candidate sync bytes are determined, the candidacy of a possible sync byte is further validated by looking in collocated positions of at least three TS packets (at 188/192 byte offset based on format). All of the positions should have the sync byte. Not having the sync byte in these positions indicates that the position is not a candidate for the start point of a TS packet. In accordance with an embodiment of the invention, the algorithm further provides for elimination of the candidate sync bytes based on certain validation conditions. A processor, operable to execute the algorithm in accordance with an embodiment of the invention is described with the help of FIG. 4.

Figure 4:
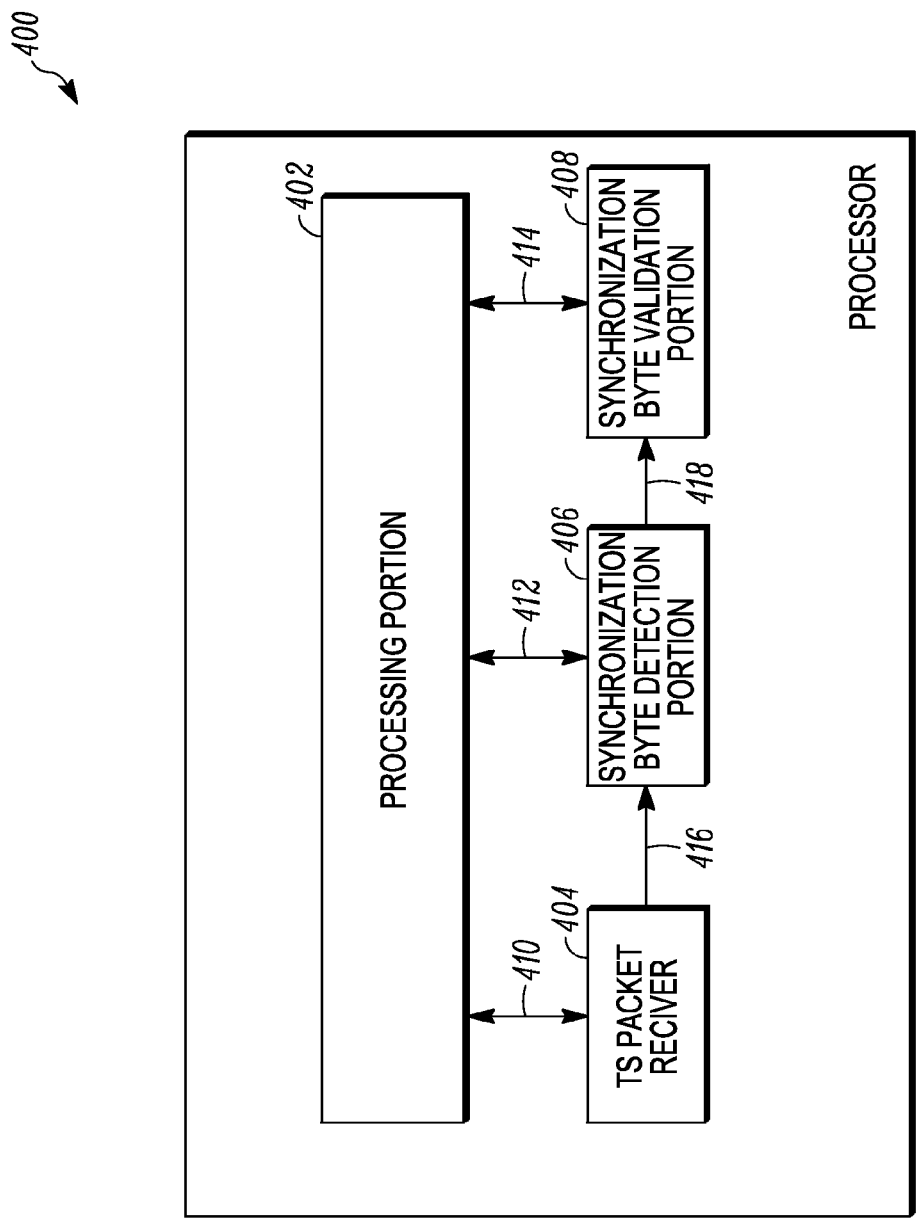
FIG. 4 illustrates a processor in accordance with an embodiment of the present invention.

FIG. 4 illustrates a processor 400 in accordance with an embodiment of the invention. As illustrated in the figure, processor 400 includes a processing portion 402, a TS packet receiver 404, a synchronization byte detection portion 406 and a synchronization byte validation portion 408. In this example, processing portion 402, TS packet receiver 404, synchronization byte detection portion 406 and synchronization byte validation portion 408 are distinct elements. However, in some embodiments, at least two of processing portion 402, TS packet receiver 404, synchronization byte detection portion 406 or synchronization byte validation portion 408 may be combined as a unitary element. In other embodiments, at least one of processing portion 402, TS packet receiver 404, synchronization byte detection portion 406 and synchronization byte validation portion 408 may be implemented as a computer having stored therein tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible computer-readable medium. Combinations of the above should also be included within the scope of tangible computer-readable media.

Figure 1:
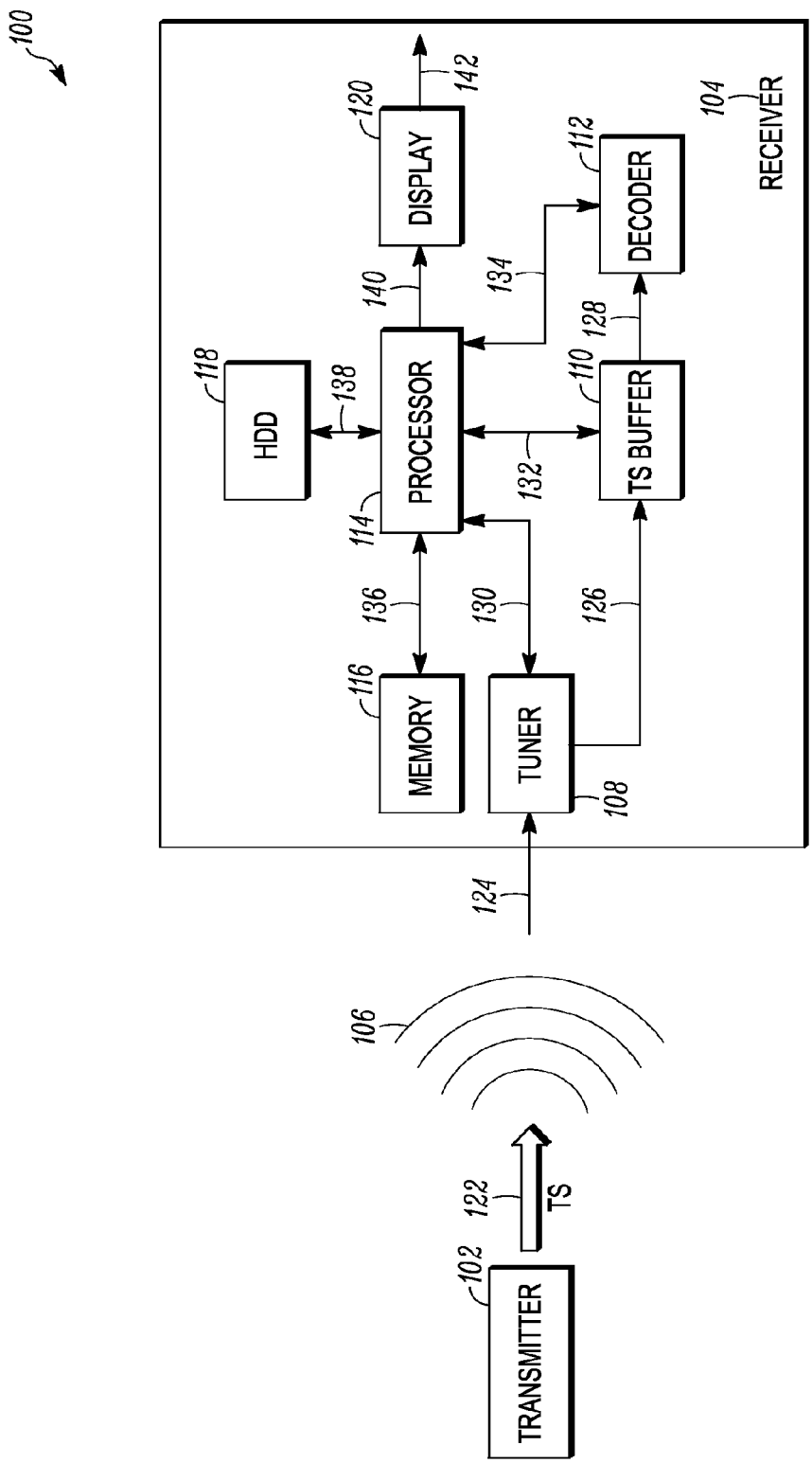
FIG. 1 illustrates a conventional communication system.
Figure 2A:
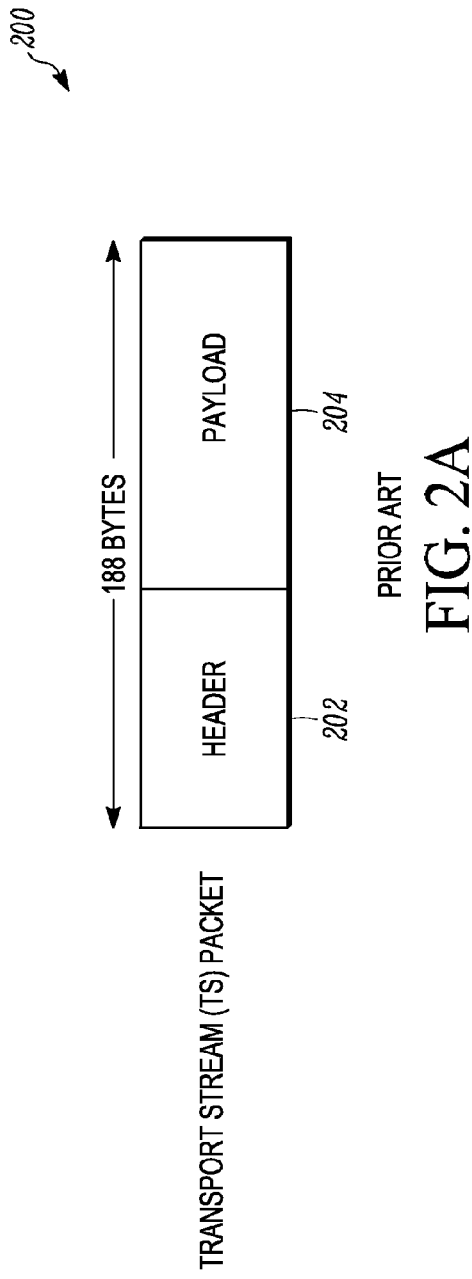
FIG. 2A illustrates a conventional TS packet.
Figure 2B:
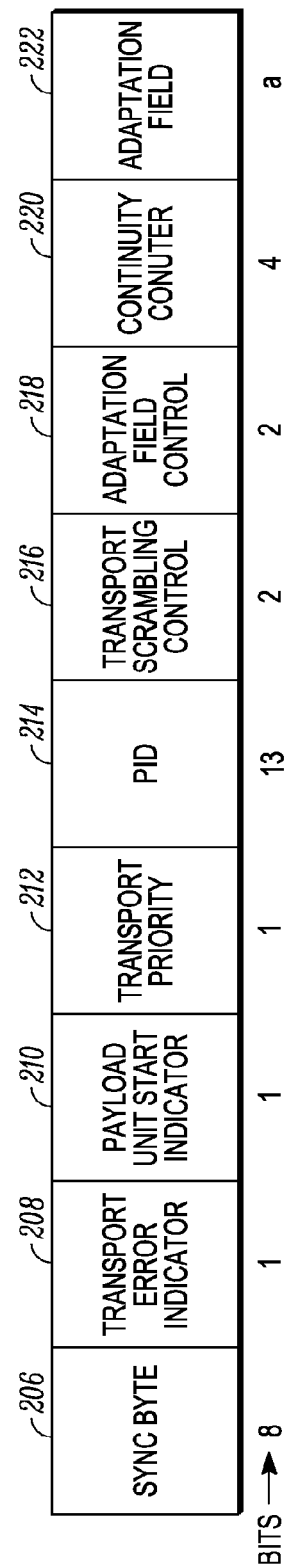
FIG. 2B illustrates an expanded form of the header in the conventional TS packet of FIG. 2A.
Figure 2C:
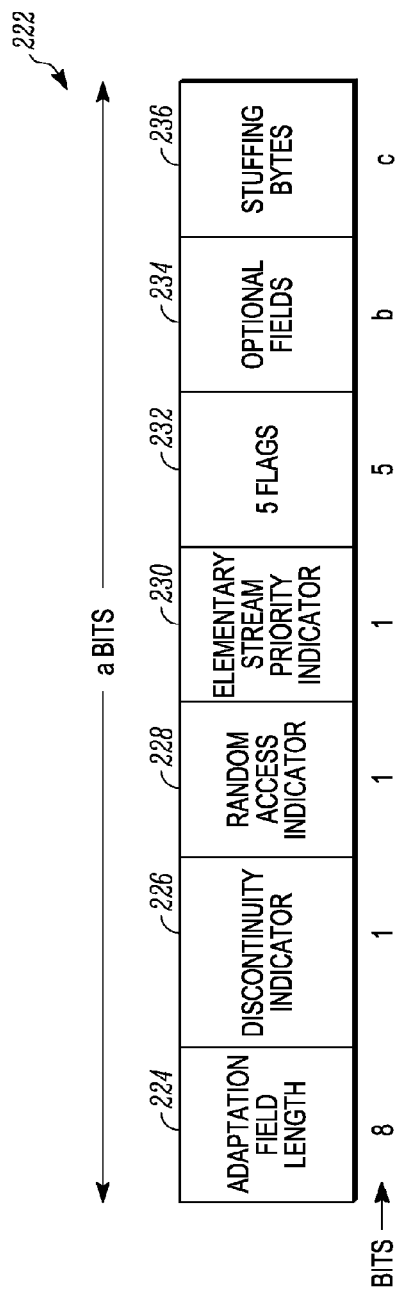
FIG. 2C illustrates an expanded form of the adaptation field of the header of FIG. 2B.
Figure 2D:
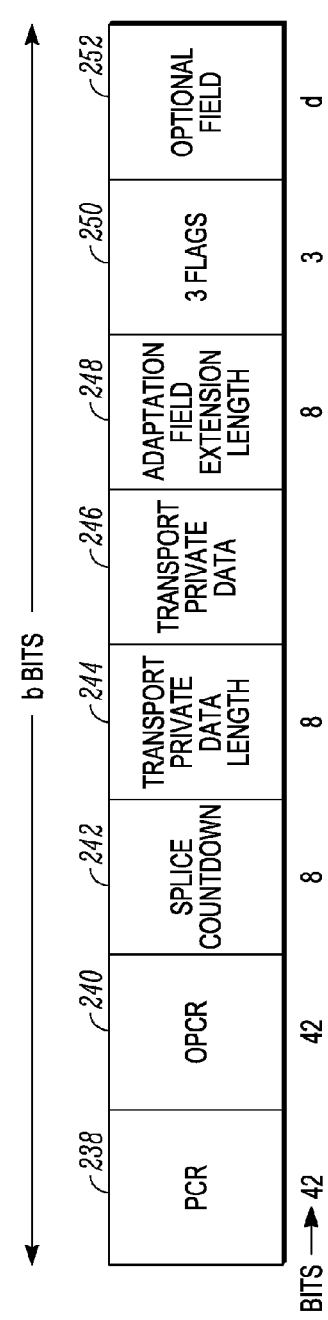
FIG. 2D illustrates an expanded form of optional fields of the adaptation field of FIG. 2C.

In an example embodiment, processor 400 is used in place of processor 114 of conventional communication system 100. Processor 400 interfaces with all the components of receiver 104, similar to processor 114, as discussed with reference to FIG. 1.

Processing portion 402 is arranged to bi-directionally communicate with TS packet receiver 404 via a signal 410; bi-directionally communicate with synchronization byte detection portion 406 via a signal 412; bi-directionally communicate with synchronization byte validation portion 408 via a signal 414. Processing portion 402 along with TS packet receiver 404, synchronization byte detection portion 406 and synchronization byte validation portion 408 are operable to execute an algorithm in accordance with various embodiments of the invention to detect synchronization byte in TS packets containing multiple emulated synchronization bytes.

TS packet receiver 404 is arranged to receive a plurality of TS packets from TS buffer 110 as instructed by processing portion 402. Note that in some cases, only a portion of the first TS packet is received, depending on the real time when receiver 104 was tuned to a channel over which the TS packet was transmitted. TS packet receiver 404 provides TS packets to synchronization byte detection portion 406 via a signal 416.

Synchronization byte detection portion 406 starts to look for a sync byte from the beginning of the portion of the first TS packet received from TS packet receiver 404. In some cases, there may be emulated sync bytes present in the TS packets in addition to the real sync byte. Therefore, processor 400 provides for the detection of emulated sync bytes and the validation of the candidacy of the sync bytes Referring now to FIGS. 5A-5C, a method 500 of detecting emulated sync bytes and of validating the candidacy of the sync bytes by a receiving communication device, such as receiver 104, that includes processor 400 are depicted in accordance with various embodiments of the invention. That is, referring back to FIG. 1, when receiver 104 is tuned to a channel by tuner 108, TS buffer 110 receives the TS packets. Substituting processor 400 into receiver 104 for processor 114, the received TS packets then are routed to processor 400, and in particular to TS packet receiver 404. Synchronization byte detection portion 406 detects candidate sync bytes, which are validated by synchronization byte validation portion 408. Once processor 400 finds the real sync byte, payload is stripped off the TS packet and fed to decoder 112 for further decoding.

Figure 5A:
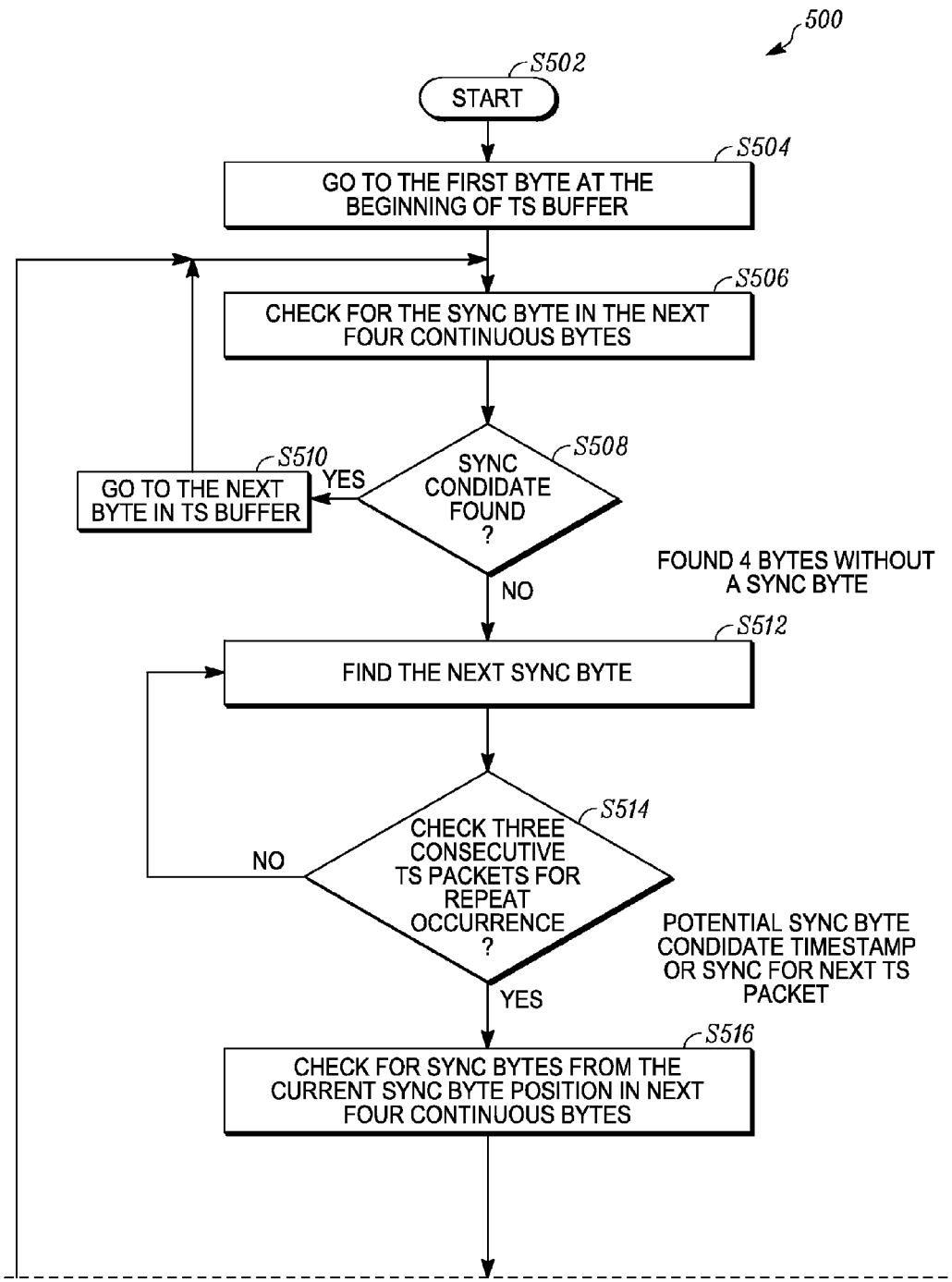
FIGS. 5A and 5B illustrate an example method for detecting candidate sync bytes in a TS packet in accordance with an embodiment of the present invention.
Figure 5B:
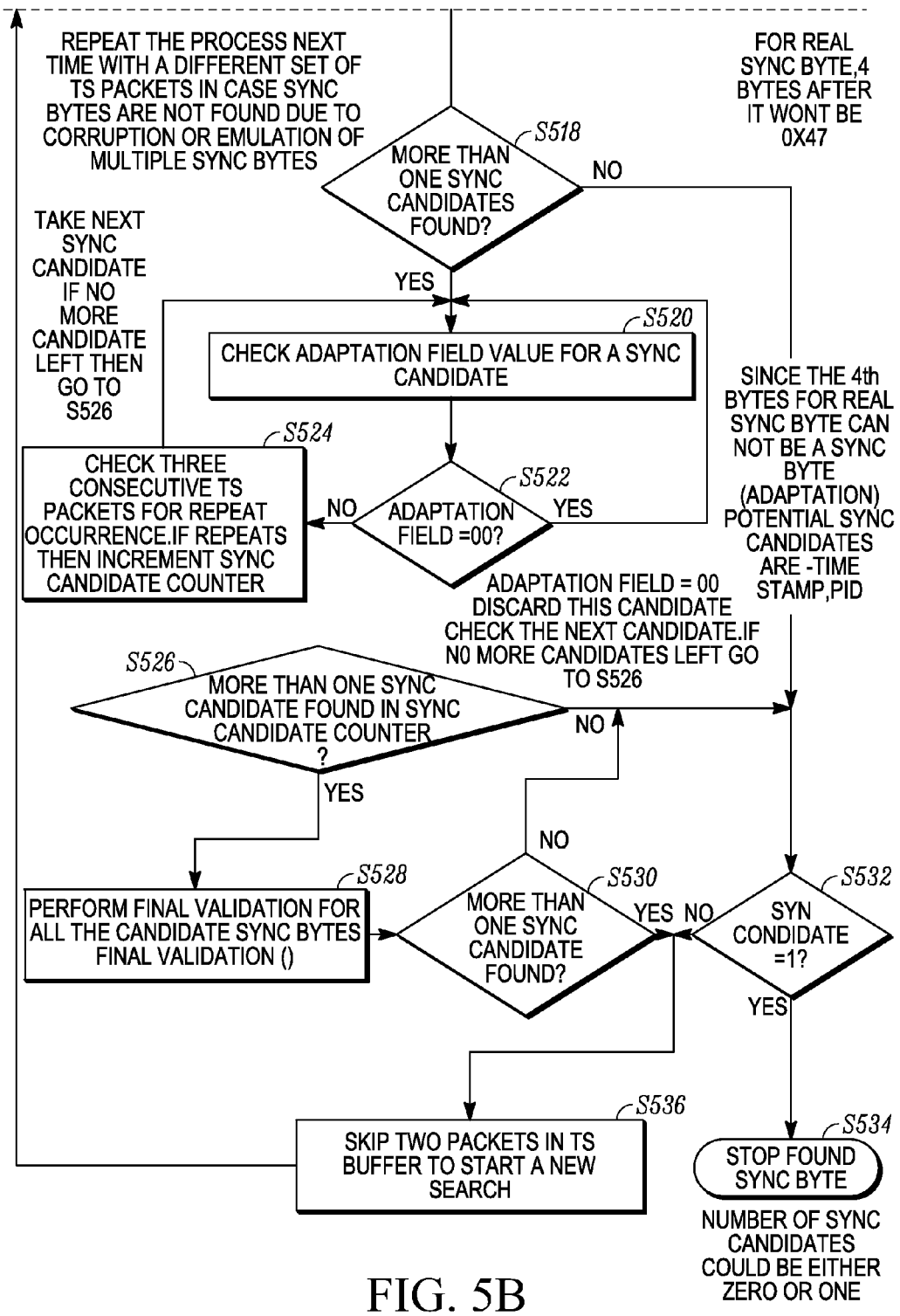

Referring now to FIGS. 5A and 5B, an example method is illustrated that is performed by processor 400, and in particular by synchronization byte detection portion 406, to detect candidate sync bytes in the TS packets in accordance with an embodiment of the present invention. Synchronization byte detection portion 406 then forwards, via a signal 418, the detected sync bytes to synchronization byte validation portion 408 for validation.

As discussed earlier, there may be emulated sync bytes present in the timestamp, PID or payload portions of a TS packet in addition to the real sync byte. Synchronization byte validation portion 408 receives candidate sync bytes from synchronization byte detection portion 406, which candidates need to be validated to find a real sync byte. The method of validating the candidacy of the sync bytes is described in detail with the help of FIG. 5C.

FIGS. 5A and 5B, and method 500, starts (S502) with a search for candidate sync bytes starts from the first byte of a TS buffer, such as TS buffer 110 (S504). The TS buffer holds a plurality of TS packets. In one example embodiment, the TS buffer holds a plurality of TS packet 300, where each TS packet 300 is 192 bytes in length. Note that the first TS packet may or may not start from the sync byte depending on the real time a channel was tuned in by a receiving device comprising processor 400, such as receiver 104.

Starting at the first byte of the TS buffer, four consecutive bytes are searched for a candidate sync byte (S506). This is further explained with reference to FIGS. 6A-6P.

FIGS. 6A-6P illustrate example embodiments of a four byte search window in a TS packet 600, in accordance with various embodiments of the invention.

TS packet 600 includes a first timestamp 602, a second timestamp 604, a third timestamp 606, a fourth timestamp 608, a sync byte 610, an indicator_PIDH byte 612, a PIDL byte 614, an adaptation control byte 616, a header_remaining field 618 and a PL field 620.

Timestamps 602, 604, 606 and 608 bytes collectively make up timestamp 302 of TS packet 300. Sync byte 610 is the same as sync byte 206.

Indicator_PIDH byte 612 includes transport error indicator 208 (1 bit), payload unit start indicator 210 (1 bit), transport priority 212 (1 bit) and a five most significant bits of PID 214 (5 bits).

PIDL byte 614 byte includes a lower 8 bits of PID 214.

Adaptation control byte 616 includes transport scrambling control 216 (2 bits), adaptation field control 218 (2 bits) and continuity counter 220 (4 bits).

Header_remaining field 618 includes the remaining bytes of header 202.

PL field 620 is the same as payload 204.

For the purpose of illustrating the principles of the present invention, suppose that the first byte of the TS buffer starts from timestamp 602, as illustrated in FIGS. 6A and 6C. Synchronization byte detection portion 406 searches for a sync byte in a four byte window that includes first timestamp 602, second timestamp 604, third timestamp 606 and fourth timestamp 608.

If a sync byte candidate is found (S508), for example, suppose the value of the sync byte is 0x47 (corresponding to a bit pattern '0100 0111') and the second timestamp 604 has a value 0x47, then the search continues from the next byte (S510), that is, the third timestamp 606, to inspect a next four consecutive bytes for a sync byte (S506). This is illustrated in FIGS. 6B and 6D.

Figures 6E, 6F:
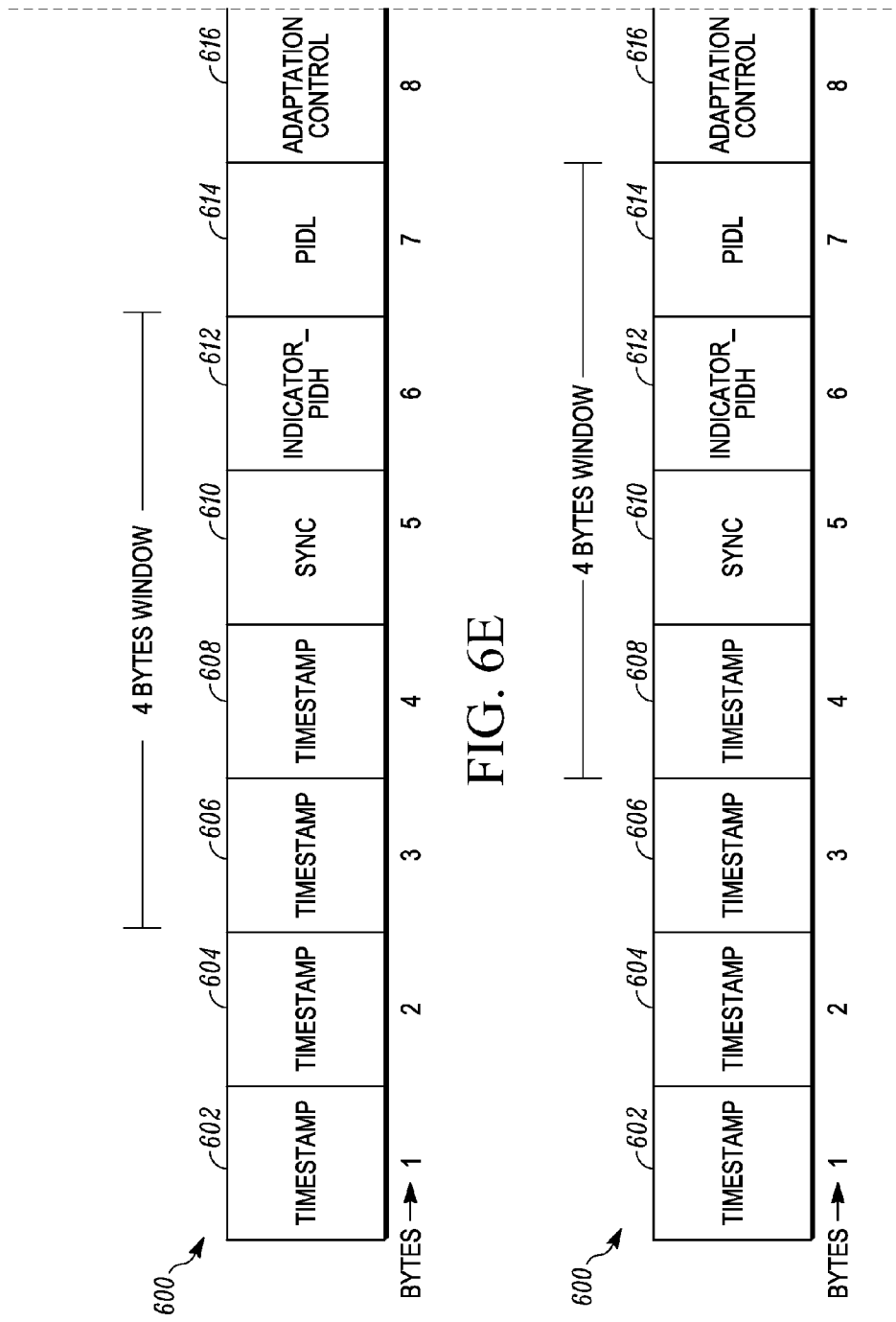
FIGS. 6A-6P illustrate example four byte search windows in a TS packet in accordance with various embodiments of the invention.

FIGS. 6B and 6D illustrate a four byte window that includes second timestamp 604, third timestamp 606, fourth timestamp 608 and sync byte 610 for a sync byte detection. As discussed earlier, assuming second timestamp 604 has a value 0x47 and the value of the sync byte is also 0x47, then a candidate sync byte has been detected. The detected candidate sync byte is ignored, and the search starts again from the next byte (S510). This is illustrated in FIGS. 6E and 6G.

FIGS. 6E and 6G illustrate a four byte window that includes third timestamp 606, fourth timestamp 608, sync byte 610, and indicator_PIDH byte 612 for a sync byte detection. Since the four byte window includes the real sync byte 610, a candidate sync byte is again detected and ignored, and the search starts again from the next byte (S510). This is illustrated in FIGS. 6F and 6H.

FIGS. 6F and 6H illustrate a four byte window including fourth timestamp 608, sync byte 610, indicator_PIDH byte 612 and PIDL byte 614 for a sync byte detection. Assuming that PIDL byte 614 is emulating the sync byte, and since the real sync byte also is present in this window, candidate sync bytes are again detected and both of the candidate sync bytes are ignored, and the search starts again from the next byte (S510). This is illustrated in FIGS. 6I and 6K.

FIGS. 6I and 6K illustrate illustrates a four byte window including sync byte 610, indicator_PIDH byte 612, PIDL byte 614 and adaptation control 616 for a sync byte detection. Again, assuming that PIDL byte 614 is emulating the sync byte, and since the real sync byte also is present in this window, candidate sync bytes are again detected and both of the candidate sync bytes are ignored, and the search starts again from the next byte (S510). This is illustrated in FIGS. 6J and 6L.

FIGS. 6J and 6L illustrate illustrates a four byte window including indicator_PIDH byte 612, PIDL byte 614, adaptation control 616 and a byte of header_remaining field 618 for a sync byte detection. Since sync byte 610 has already passed, a maximum possible sync bytes within header 202 is two. Again, assuming that PIDL byte 614 is emulating the sync byte, a candidate sync byte is again detected and ignored, and the search starts again from the next byte (S510). This is illustrated in FIGS. 6M and 6O.

FIGS. 6M and 6O illustrate a four byte window including PIDL byte 614, adaptation control 616 and two bytes of header_remaining field 618 for a sync byte detection. Again, assuming that PIDL byte 614 is emulating the sync byte, a sync byte is again detected and ignored and the search starts again from the next byte (S510). This is illustrated in FIGS. 6N and 6P.

FIGS. 6N and 6P illustrate a four byte window including adaptation control 616 and three bytes of header_remaining field 618 for a sync byte detection. Most likely there is no emulated sync byte in this four byte window. Since there is no PID byte or timestamp bytes for the rest of TS packet 600, the only possibility for an emulated sync byte is in PL 620.

As illustrated in FIGS. 6N and 6P, there is no candidate sync byte found in the four bytes window depicted in FIGS. 6N and 6P, so the search continues to look for the next sync byte (S512). The possible candidates for sync bytes now are either PL 620 or the timestamp or the real sync byte of the next TS packet. This is explained further with reference to FIGS. 7A-7C.

Figure 7A:
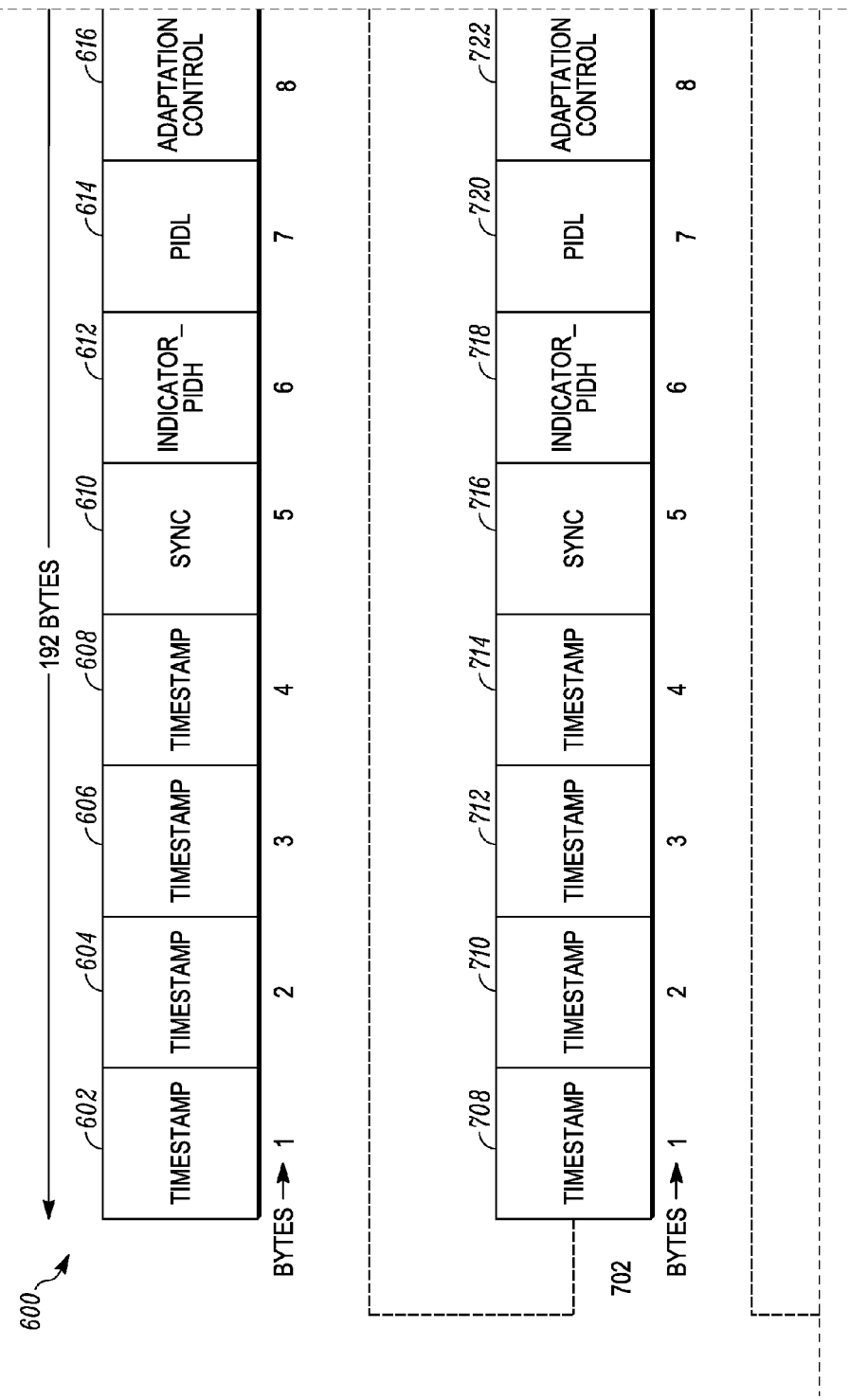
Figure 7C:
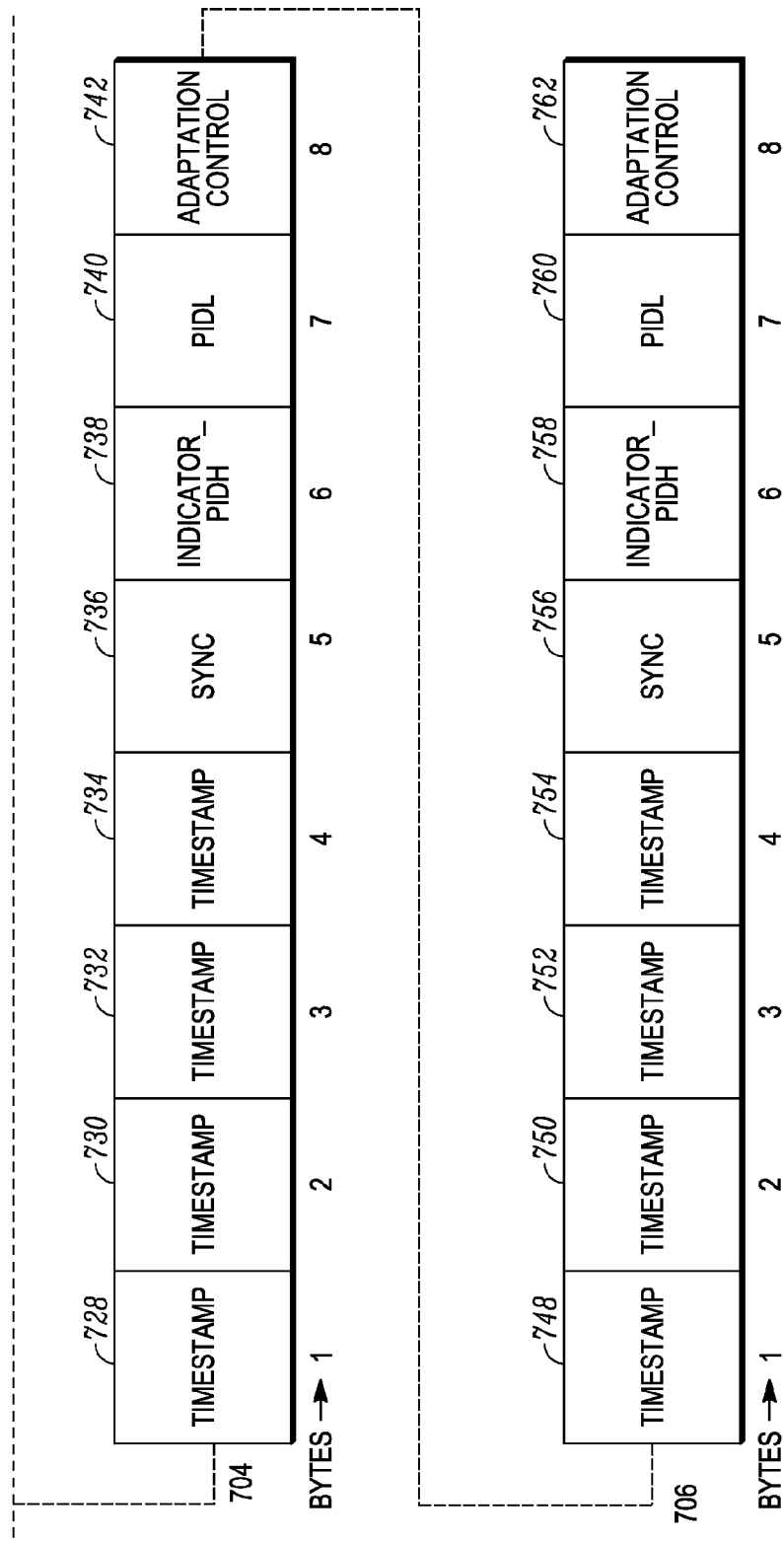

FIGS. 7A-7C illustrate four consecutive TS packets in accordance with an embodiment of the invention.

FIGS. 7A-7C illustrate TS packet 600 successively followed by a TS packet 702, a TS packet 704 and a TS packet 706. Note that TS packet 702, TS packet 704 and TS packet 706 are complete packets as compared to TS packet 600, which may not start from the sync byte. However, for illustration purposes, all of the fields of TS packet 702, TS packet 704 and TS packet 706 are shown similar to TS packet 600.

As discussed above, all the previous occurrences of candidate sync bytes found using a four byte window are ignored and the next sync byte is searched (S512). Now, the only possible candidates for a sync byte may be in PL 620 of TS packet 600 and in timestamp 708, timestamp 710, timestamp 712, timestamp 714 or real sync byte 716 of TS packet 702. When a candidate sync byte is found in one of these fields, the next three TS packets 702, 704 and 706 are searched for a repeat occurrence of the sync byte at a same location in each packet (S514).

As an example, if a sync byte is found at a location in PL 620, PL 726 should have the sync byte 192 bytes away from the location of the detected sync byte in PL 620. Similarly, PL 746 should have the sync byte 192 bytes away from the expected sync byte location in PL 726. Lastly, PL 766 should have the sync byte 192 bytes away from the expected sync byte location in PL 746. Three consecutive packets are searched in order to rule out the possibility of duplicate packets. As per standards, only two duplicate packets are allowed. Hence, the possibility of having an emulated (fake) sync byte at the same location in each of PL 726, PL 746 and PL 766 is very rare. Therefore, it can be concluded that a candidate (emulated) sync byte in PL 620 is not a real sync byte if it is not present at the same location in all three packets. This is further explained with reference to FIG. 8A.

Once it is determined that a candidate sync byte does not exist in a same location in each of TS packet 702, TS packet 704 and TS packet 706, the search continues for a next sync byte (S512). The only possibilities left for a candidate sync byte now are in timestamp 708, timestamp 710, timestamp 712, timestamp 714 or real sync byte 716.

If a sync byte candidate is found in TS packet 702 (S512), the next two TS packets (i.e., TS packets 704 and 706) are checked at the same location for the sync byte candidate (S514). If the sync byte is found in three consecutive TS packets at the same location, further validation is done by checking for the sync bytes in next four continuous bytes from the current sync byte location (S516).

If more than one sync byte candidate is found (S518), further validation is performed by checking the fourth byte from the current sync byte location for an adaptation field value (S520). A value of '00' is otherwise reserved for adaptation field control 218, therefore, adaptation field control 218 can only take on the values '01,' '10,' or '11.' When adaptation field control 218 is not equal to zero, any combination of scrambling control 216 (2 bits), adaptation field control 218 (2 bits) and continuity counter 220 cannot form a sync byte when the sync byte is set to a fixed value of 0x47.

If adaptation field value is set to '00' (S522), then this is not a sync byte candidate, therefore this sync byte is ignored and the adaptation field value (in fourth byte) from the next sync byte candidate position is checked (S520). The steps (S520) and (S522) are repeated for all possible candidate sync bytes.

Based on the above discussion, it can be concluded that the fourth byte from the start of a TS packet cannot be a sync byte. Therefore, if the sync byte is emulated in the Timestamp field or the PID field, then that candidate sync byte can be eliminated by checking the adaption field value (which cannot be '00'). That is, and referring now to FIG. 8, an example TS timestamp field and header field is illustrated in accordance with an embodiment of the invention. The bits of the adaptation field depicted in FIG. 8 cannot be '00' because this combination of bits is otherwise reserved under international standards (ISO). Therefore, the adaptation field bits must either be '01,' '10,' or '11.' With these three possible bit patterns, regardless of what the other bits may be in the fourth byte, the fourth byte value cannot be 0x47 (which has a bit pattern of '0100 0111').

Figure 8:
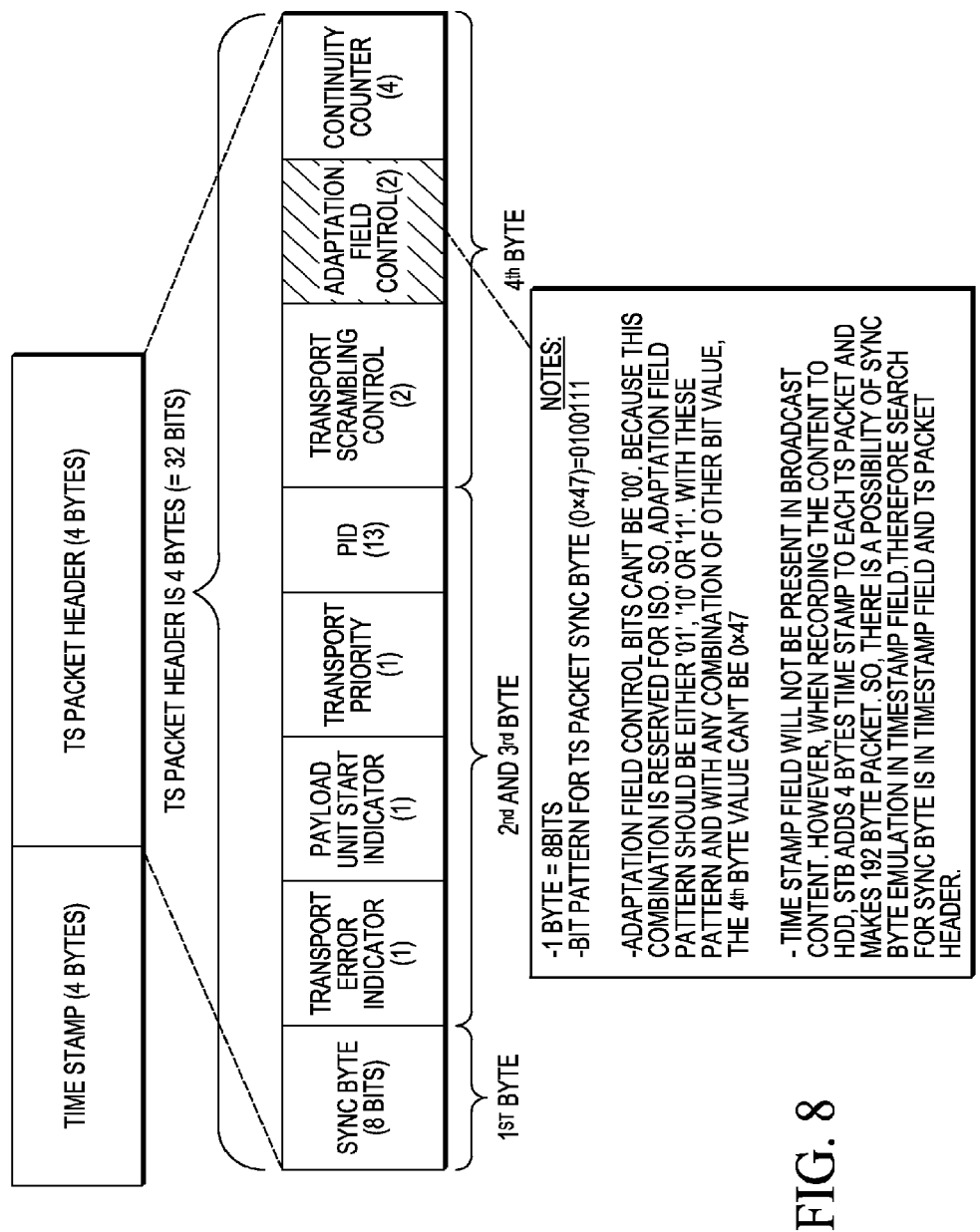
FIG. 8 illustrates an example TS timestamp field and header field in accordance with an embodiment of the invention.

In other words, suppose a candidate sync byte occurs at the timestamp field of the TS packet or at the PID field (in the third byte of the TS packet header depicted in FIG. 8). Assuming that, as a real sync byte, the fourth byte of the TS packet header of FIG. 8 is inspected, which fourth byte includes the adaptation field value (which is in the $3^{rd}$ byte from the candidate sync byte, as shown in FIG. 8). If one started searching for a candidate sync byte in the Timestamp field or the PID field, then finding the adaptation field value for that TS packet gives a first indication of whether that is a real sync byte (although not conclusive). If the adaption field value is zero ('00'), then that candidate sync byte can be immediately disqualified. If the adaptation field value is not zero, then that candidate sync byte is further validated for three consecutive packets as described below. That is, three consecutive TS packets then are searched for repeated occurrence of the sync byte (S524).

In other words, if the adaptation field value (in the fourth byte of the TS packet header) from current sync byte position is equal to '00' (S522), then the sync byte candidate found in (S512) is not a real sync byte. Further, if the fourth byte from current sync byte position is a sync byte (S522), then the sync byte candidate found in (S512) is not a real sync byte as, for a real sync byte, the fourth byte cannot be 0x47 because that makes the adaption field value zero ('00'), which is not possible.

The possible candidates then are timestamp 708, timestamp 710, timestamp 712 or timestamp 714. To validate a detected sync byte, three consecutive TS packets are searched for repeated occurrence of the detected sync byte (S524). With respect to the detection of a candidate sync byte in timestamp 708, timestamps 728 and 748 are checked to verify the candidacy of timestamp 708 as a sync byte. With respect to the detection of a candidate sync byte in timestamp 710, timestamps 730 and 750 are checked to verify the candidacy of timestamp 710 as a sync byte. With respect to the detection of a candidate sync byte in timestamp 712, timestamps 732 and 752 are checked to verify the candidacy of timestamp 712 as a sync byte.

If the sync byte is not at the same location in TS packet 702, TS packet 704 and TS packet 706, then this candidate sync byte is invalidated and a next candidate sync byte is searched for (S516 still has some candidates left). On the other hand, if a candidate sync byte is found at the same location in TS packet 702, TS packet 704 and TS packet 706, then the candidate sync byte is a possible real sync byte and a sync candidate counter is updated (S524). A final validation for all the candidate sync bytes present in the sync candidate counter is performed (S528), as discussed with reference to FIG. 5C. For all candidates obtained (in S516), three consecutive TS packets are searched for repeat occurrences (S524).

The number of sync byte candidates found in a TS packet (S518 or S526 or S530) could be zero, one, or more than one. If more than one sync byte candidate is found (S518 or S526 or S530) or zero sync candidates are found (S532), for example, due to corruption, then the next two TS packets are skipped in the TS buffer (S536) and the process is repeated again (S506) with the new set of TS packets.

If only one sync byte is found (per TS packet (S532), then it is assumed to be the real sync byte and the process stops (S534).

Figure 5C:
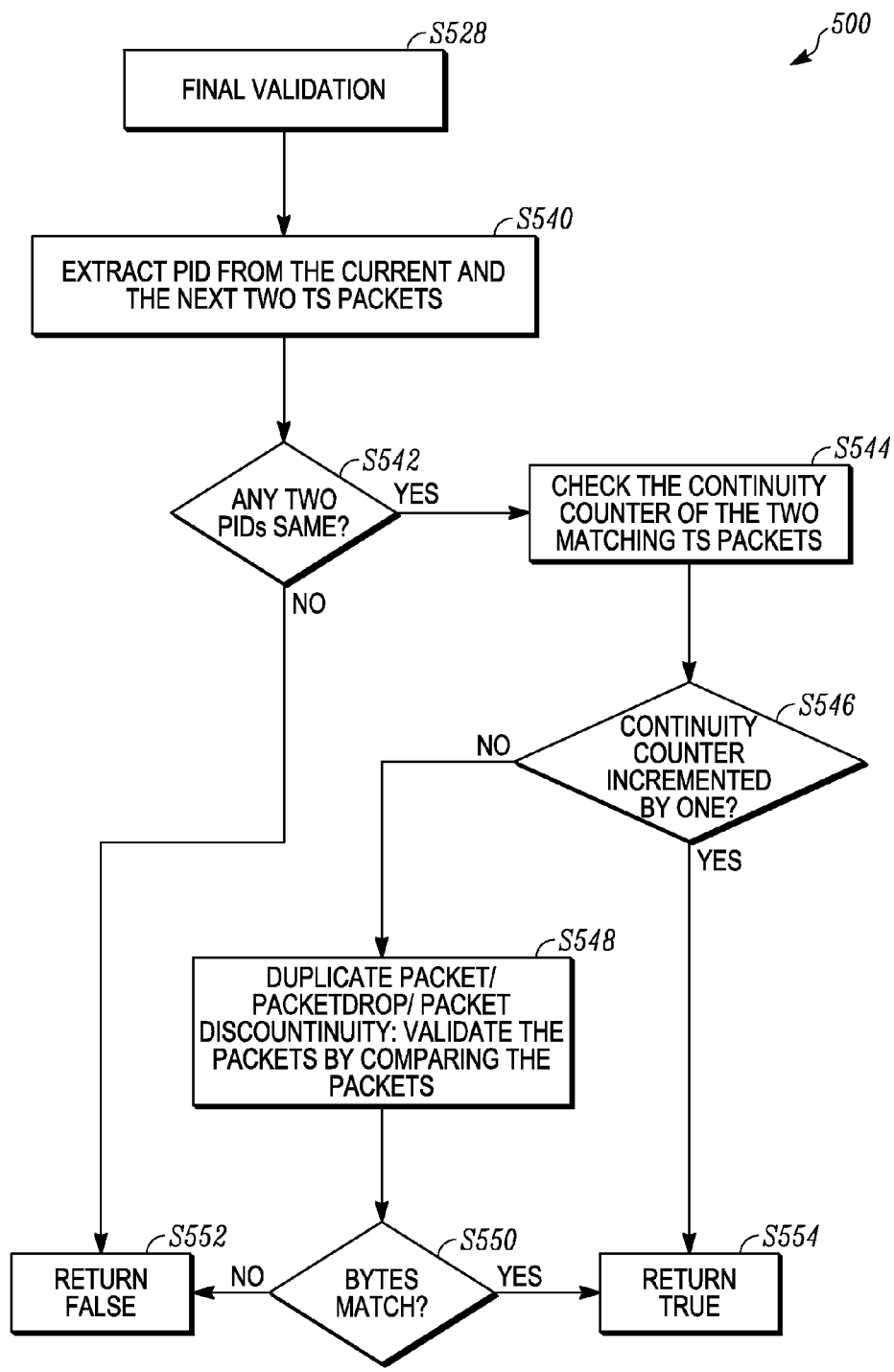
FIG. 5C illustrates an example method for validating candidate sync bytes in a TS packet in accordance with an embodiment of the present invention.

Referring now to FIG. 5C, an example method is illustrated that is performed by processor 400, and in particular by synchronization byte validation portion 408, to finally validate all of the candidate sync bytes found in a TS packet in accordance with an embodiment of the present invention. For final validation, the method starts (method 500 resumes) (S528) when a PID is extracted (S540) from the current TS packet, that is, TS packet 702, and from the next two TS packets, that is, TS packet 704 and TS packet 706. For TS packet 702, the PID includes the lower 5 bits of indicator_PIDH 718 byte and PIDL 720 byte. For TS packet 704, the PID includes the lower 5 bits of indicator_PIDH 738 byte and PIDL 740 byte. And for TS packet 706, the PID includes the lower 5 bits of indicator_PIDH 758 byte and PIDL 760 byte. The PIDs from these three TS packets are compared to each other to see if any two PIDs are same (S542). If any two PIDs are same, then a continuity counter of each of the two matching TS packets is checked (S544) based on the assumption that the continuity counter value is incremented for every TS packet belonging to the same stream.

For TS packet 702, the continuity counter is the last 4 bits of adaptation control 722. For TS packet 704, the continuity counter is the last 4 bits of adaptation control 742. For TS packet 706, the continuity counter is the last 4 bits of adaptation control 762. The continuity counter of a TS packet should be incremented by exactly one between the previous packet and the current packet when their PIDs match. If the continuity counter is not incremented by one (S548), then this is an indication of duplicate packets or packet drop or discontinuation of a packet. For example, if the continuity counters of TS packet 704 and TS packet 706 are same, then TS packet 704 and TS packet 706 are duplicate packets. In this case, a same five randomly chosen bytes in each of PL 746 and PL 766 are checked to verify that TS packet 704 and TS packet 706 are duplicates (S550). If all five random bytes match, then the candidate sync byte is validated (S554). If any of the five random bytes does not match then the candidate sync byte is not a real sync byte (S552).

If the continuity counters of the two TS packets are off by a byte, for example, the continuity counter for TS packet 706 is one more than the continuity counter for TS packet 704, then processor 400, and in particular synchronization byte validation portion 408, can conclude that TS packet 704 and TS packet 706 are not duplicate packets and, therefore, the candidate sync byte is a valid sync byte (S554).

In the event that the two TS packets are duplicate packets (S548), then processor 400 returns a finding of 'TRUE' for all of the detected sync byte candidates (S554). That is, in case of real duplicate packets, 'TRUE' is returned for all the sync byte candidates. In the event that the two TS packets are non-duplicate packets, then the five random bytes do not match (S550) and processor 400 returns a finding of 'FALSE' (that is, non-duplicate packets) for all of the detected sync byte candidates (S552). In both instances, the search for a new sync byte starts again (S536) since the number of sync byte candidates is either zero (0) or more than one (1). That is, the method returns to step S530, where processor 400 determines whether either zero (0) or more than one (1) candidate sync byte has been found (S532) and the processor decides either to repeat the method after skipping two packets (S536) or to stop, due to having found a sync byte (S534).

As discussed with reference to FIGS. 4-7C, aspects of the invention provide a method to detect emulated sync bytes in TS packets and to eliminate the wrong candidates by performing certain validation checks. The possible candidates for emulated sync bytes in a 192 bytes TS packet are timestamp, PID and payload. In accordance with an aspect of the invention, first novel step is to make sure that the search for the sync byte is started from the payload and not from the PID. In order to avoid detecting a PID emulated sync byte first, four consecutive bytes are searched from the beginning of the buffer to look for a candidates sync byte until no sync byte is found in four consecutive bytes. This guarantees that the detected sync byte is not a PID emulated sync byte.

All the candidate sync bytes found above are ignored until no sync byte is found in four consecutive bytes. Once a candidate sync byte is found, candidacy of a possible sync byte is further validated by looking in collocated positions of at least three TS packets (at 188/192 byte offset based on format). If the sync byte is not found at the same location in all three TS packets then it is an indication that this byte position is not a candidate for the start point of a TS packet.

Once a candidate sync byte is found at the same location in all three TS packets, its candidacy is further validated by checking for sync bytes from the current sync byte position in next four continuous bytes. If more than one sync byte candidate is found, then the fourth byte from the current sync byte is checked for a possible sync byte candidate. Since the fourth byte from a real sync byte cannot be a sync byte, as discussed earlier, this provides further elimination of emulated sync bytes. Further, if more than one sync byte candidate is found then the adaptation field value (in the fourth byte from the current sync byte candidate in that TS header) for a particular sync byte is checked for value '00' and is discarded as a sync byte if the adaptation field value is '00'.

If the adaptation field of a candidate sync byte is not '00', then three consecutive TS packets are searched for repeat occurrences of the candidate sync byte. If more than one candidate sync byte is found, then a final validation check is performed to rule out duplicate packets or dropped packets or discontinued packets.

After the final validation check, if there is still more than one sync byte or if there are zero sync bytes, then next two TS packets are skipped in the TS buffer and the search for a sync byte starts from there. In the event that a single sync byte found, then the search is stopped.

Note that the above discussion assumes a 192 bytes TS packet with a timestamp prefix. For 188 bytes TS packet, the same discussion applies, except that the timestamp scenario does not exist.

In accordance with embodiments of the invention, methods discussed above provide a more stable system for the end users, in particular, stable DVR functionality during trick play sessions.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method, comprising:
receiving, by a system including a processor, a plurality of transport stream packets;
detecting, by the system, beginning at a first transport stream packet of the plurality of transport stream packets, a continuous four-byte pattern that does not include a predetermined synchronization value; and
detecting, by the system after the continuous four-byte pattern, an occurrence of a first byte having the predetermined synchronization value.

2. The method of claim 1, further comprising validating, by the system, that the first byte is a candidate synchronization byte in response to detecting a first subsequent byte having the predetermined synchronization value and separated by a predetermined length from the first byte in the plurality of transport stream packets, and detecting a second subsequent byte having the predetermined synchronization value and separated by the predetermined length from the first subsequent byte in the plurality of transport stream packets.

3. The method of claim 2, further comprising:
detecting, by the system after the continuous four-byte pattern, an occurrence of a second byte having the predetermined synchronization value;
determining, by the system, whether an additional byte after the second byte has the predetermined synchronization value;
in response to the additional byte having the predetermined synchronization value, determining, by the system, that the second byte can be another candidate synchronization byte; and
in response to the additional byte not having the predetermined synchronization value, determining, by the system, that the second byte is not another candidate synchronization byte.

4. The method of claim 3, further comprising:
in response to determining that the second byte can be another candidate synchronization byte, determining, by the system, whether an adaptation field of the second byte is set to a predetermined adaptation field value;
in response to determining that the adaptation field of the second byte is set to the predetermined adaptation field value, determining, by the system, that the second byte is not another candidate synchronization byte; and
in response to determining that the adaptation field of the second byte is not set to the predetermined adaptation field value, confirming, by the system, that the second byte can be another candidate synchronization byte.

5. The method of claim 4, further comprising:
in response to confirming that the second byte can be another candidate synchronization byte, validating, by the system, that the second byte is a candidate synchronization byte in response to detecting a first subsequent other byte having the predetermined synchronization value and separated by the predetermined length from the second byte in the plurality of transport stream packets, and detecting a second subsequent other byte having the predetermined synchronization value and separated by the predetermined length from the first subsequent other byte in the plurality of transport stream packets.

6. The method of claim 5, further comprising:
in response to validating that the second byte is the candidate synchronization byte, determining, by the system, whether a duplicate transport stream packet has occurred.

7. The method of claim 6, further comprising:
in response to determining that a duplicate transport stream packet has occurred, determining, by the system, that the first byte is a sync byte.

8. A non-transitory computer-readable medium having instructions stored thereon that, in response to execution, cause a system including a processor to perform operations comprising:
   receiving a plurality of transport stream packets;
   detecting beginning at a first transport stream packet of the plurality of transport stream packets, a continuous four-byte pattern that does not include a predetermined synchronization value; and
   detecting, after the continuous four-byte pattern, an occurrence of a first byte having the predetermined synchronization value.

9. The non-transitory computer-readable medium of claim 8, the instructions further cause the system to perform operations comprising validating that the first byte is a candidate synchronization byte in response to detecting a first subsequent byte having the predetermined synchronization value and separated by a predetermined length from the first byte in the plurality of transport stream packets, and detecting a second subsequent byte having the predetermined synchronization value and separated by the predetermined length from the first subsequent byte in the plurality of transport stream packets.

10. The non-transitory computer-readable medium of claim 9, the instructions further cause the system to perform operations comprising:
   detecting, after the continuous four-byte pattern, an occurrence of a second byte having the predetermined synchronization value;
   determining whether an additional byte after the second byte has the predetermined synchronization value;
   in response to the additional byte having the predetermined synchronization value, determining that the second byte can be another candidate synchronization byte; and
   in response to the additional byte not having the predetermined synchronization value, determining that the second byte is not another candidate synchronization byte.

11. The non-transitory computer-readable medium of claim 10, the instructions further cause the system to perform operations comprising:
   in response to determining that the second byte can be another candidate synchronization byte, determining whether an adaptation field of the second byte is set to a predetermined adaptation field value;
   in response to determining that the adaptation field of the second byte is set to the predetermined adaptation field value, determining that the second byte is not another candidate synchronization byte; and
   in response to determining that the adaptation field of the second byte is not set to the predetermined adaptation field value, confirming that the second byte can be another candidate synchronization byte.

12. The non-transitory computer-readable medium of claim 11, the instructions further cause the system to perform operations comprising:
   in response to confirming that the second byte can be another candidate synchronization byte, validating that the second byte is a candidate synchronization byte in response to detecting a first subsequent other byte having the predetermined synchronization value and separated by the predetermined length from the second byte in the plurality of transport stream packets, and detecting a second subsequent other byte having the predetermined synchronization value and separated by the predetermined length from the first subsequent other byte in the plurality of transport stream packets.

13. The non-transitory computer-readable medium of claim 12, the instructions further cause the system to perform operations comprising:
   in response to validating that the second byte is the candidate synchronization byte, determining whether a duplicate transport stream packet has occurred.

14. The non-transitory computer-readable medium of claim 13, the instructions further cause the system to perform operations comprising:
   in response to determining that a duplicate transport stream packet has occurred, determining that the first byte is a sync byte.

15. A system, comprising:
   a processor; and
   a memory communicatively coupled to the processor, the memory having stored therein computer-executable instructions, comprising:
      a receiver configured to receive a plurality of transport stream packets;
      a synchronization byte detection portion configured to:
         detect beginning at a first transport stream packet of the of the plurality of transport stream packets, a continuous four-byte pattern that does not include a predetermined synchronization value; and
         detect, after the continuous four-byte pattern, an occurrence of a first byte having the predetermined synchronization value.

16. The system of claim 15, wherein the synchronization byte detection portion is further configured to validate that the first byte is a candidate synchronization byte in response to detection of a first subsequent byte having the predetermined synchronization value and separated by a predetermined length from the first byte in the plurality of transport stream packets, and detection of a second subsequent byte having the predetermined synchronization value and separated by the predetermined length from the first subsequent byte in the plurality of transport stream packets.

17. The system of claim 16, wherein the synchronization byte detection portion is further configured to:
   detect, after the continuous four-byte pattern, an occurrence of a second byte having the predetermined synchronization value;
   determine whether an additional byte after the second byte has the predetermined synchronization value;
   in response to the additional byte having the predetermined synchronization value, determine that the second byte can be another candidate synchronization byte; and
   in response to the additional byte not having the predetermined synchronization value, determine that the second byte is not another candidate synchronization byte.

18. The system of claim 17, wherein the synchronization byte detection portion is further configured to:
   in response to a determination that the second byte can be another candidate synchronization byte, determine whether an adaptation field of the second byte is set to a predetermined adaptation field value;
   in response to a determination that the adaptation field of the second byte is set to the predetermined adaptation field value, determine that the second byte is not another candidate synchronization byte; and
   in response to a determination that the adaptation field of the second byte is not set to the predetermined adaptation field value, confirm that the second byte can be another candidate synchronization byte.

19. The system of claim 18, wherein the synchronization byte detection portion is further configured to:

in response to confirming that the second byte can be another candidate synchronization byte, validate that the second byte is a candidate synchronization byte in response to detection of a first subsequent other byte having the predetermined synchronization value and separated by the predetermined length from the second byte in the plurality of transport stream packets, and detection of a second subsequent other byte having the predetermined synchronization value and separated by the predetermined length from the first subsequent other byte in the plurality of transport stream packets.

20. The system of claim 19, wherein the synchronization byte detection portion is further configured to:
- in response to validating that the second byte is the candidate synchronization byte, determine whether a duplicate transport stream packet has occurred; and
- in response to a determination that a duplicate transport stream packet has occurred, determine that the first byte is a sync byte.

* * * * *